(12) United States Patent
Dong et al.

(10) Patent No.: US 10,491,686 B2
(45) Date of Patent: Nov. 26, 2019

(54) INTELLIGENT NEGOTIATION SERVICE FOR INTERNET OF THINGS

(71) Applicant: CONVIDA WIRELESS, LLC, Wilmington, DE (US)

(72) Inventors: Lijun Dong, San Diego, CA (US); Chonggang Wang, Princeton, NJ (US); Dale N. Seed, Allentown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 253 days.

(21) Appl. No.: 14/889,015

(22) PCT Filed: May 6, 2014

(86) PCT No.: PCT/US2014/036919
§ 371 (c)(1),
(2) Date: Nov. 4, 2015

(87) PCT Pub. No.: WO2014/182665
PCT Pub. Date: Nov. 13, 2014

(65) Prior Publication Data
US 2016/0119434 A1    Apr. 28, 2016

Related U.S. Application Data

(60) Provisional application No. 61/819,922, filed on May 6, 2013.

(51) Int. Cl.
*H04L 29/08* (2006.01)
*H04W 4/70* (2018.01)
(Continued)

(52) U.S. Cl.
CPC .......... *H04L 67/16* (2013.01); *H04L 12/1492* (2013.01); *H04L 41/5054* (2013.01);
(Continued)

(58) Field of Classification Search
CPC ....... H04L 67/16; H04L 67/125; H04L 67/12; H04L 41/5054; H04W 4/005
See application file for complete search history.

(56) References Cited

U.S. PATENT DOCUMENTS 8,943,132 B2   1/2015  Foti
2011/0213871 A1   9/2011  Di Girolamo et al.
(Continued)

FOREIGN PATENT DOCUMENTS

JP    2008-059103 A    3/2008
JP    2011-072347 A    4/2011
(Continued)

OTHER PUBLICATIONS

European Patent Application No. 14728052: Extended EP Search Report dated Jan. 17, 2017, 7 pages.
(Continued)

*Primary Examiner* — Nam T Tran
(74) *Attorney, Agent, or Firm* — BakerHostetler

(57) ABSTRACT

Disclosed herein are devices, methods, and systems for providing negotiation between IoT Things, IoT entities, and/or IoT applications as a service. IoT entities may be admitted to a negotiation service that may locate a target service and request service from the target service on behalf of the requesting IoT entity. A variety of services and related parameter may be negotiated, such as a work schedule for a set of devices performing a similar function in a similar space, price of service, and duration of service.

20 Claims, 21 Drawing Sheets

(51) Int. Cl.
H04L 12/24 (2006.01)
H04L 12/14 (2006.01)
H04W 4/02 (2018.01)

(52) U.S. Cl.
CPC .......... H04L 67/125 (2013.01); H04L 67/327 (2013.01); H04W 4/70 (2018.02); *H04W 4/023* (2013.01)

(56) References Cited

U.S. PATENT DOCUMENTS

| | | | |
|---|---|---|---|
| 2012/0117140 A1* | 5/2012 | Wang | H04W 4/70 709/201 |
| 2012/0178464 A1* | 7/2012 | Li | H04W 72/02 455/450 |
| 2013/0024556 A1* | 1/2013 | Zhu | H04L 67/125 709/223 |
| 2013/0066965 A1* | 3/2013 | Foti | H04W 4/70 709/204 |
| 2013/0072245 A1 | 3/2013 | Lee et al. | |
| 2013/0110857 A1 | 5/2013 | Chen et al. | |
| 2013/0144946 A1 | 6/2013 | Vijayaraman et al. | |
| 2013/0159302 A1 | 6/2013 | Huang et al. | |
| 2013/0336222 A1 | 12/2013 | Lu et al. | |
| 2014/0089478 A1 | 3/2014 | Seed et al. | |
| 2014/0115335 A1 | 4/2014 | Jorden et al. | |
| 2015/0055464 A1 | 2/2015 | Synnergren | |

FOREIGN PATENT DOCUMENTS

| | | |
|---|---|---|
| JP | 2014-505382 | 2/2014 |
| WO | 2010/055648 A1 | 5/2010 |
| WO | WO 2012-068465 A1 | 5/2012 |
| WO | WO 2012-109531 A2 | 8/2012 |
| WO | WO 2012-118711 A2 | 9/2012 |

OTHER PUBLICATIONS

Japanese Patent Application No. 2016-513006: Notice of Reasons for Rejection dated Feb. 3, 2017, 4 pages.

Minemura et al, "A Safe Cooperation Method for Multiple Devices", The Institute of Electronics, Information and Communication Engineers, IEICE Technical Report, Jan. 2009, 108(393), 33-38 (English abstract available on first page).

European Telecommunications Standards Institute (ETSI), TS 102 921 V1.1.1., "Machine-to-Machine Communications (M2M); mla, dla and mld interfaces", Feb. 2012, 538 pages.

European Telecommunications Standards Institute (ETSI), TS 102 690 V1.1.1, "Machine-to-Machine Communications (M2M); Functional Architecture", Oct. 2011, 280 pages.

International Application No. PCT/US2014/36919: International Search Report and Written Opinion dated Dec. 16, 2014, 14 pages.

International Application No. PCT/US2014/36919: Preliminary Report on Patentability dated May 8, 2015, 9 pages.

* cited by examiner

INTELLIGENT NEGOTIATION SERVICE FOR INTERNET OF THINGS

CROSS-REFERENCE TO RELATED APPLICATIONS

This application is a National Stage Application filed under 35 U.S.C. 371 of International Application No. PCT/US2014/036919, filed May 6, 2014, which claims the benefit of U.S. Provisional Patent Application No. 61/819,922, filed May 6, 2013, entitled "INTELLIGENT NEGOTIATION SERVICE FOR INTERNET OF THINGS", the contents of which are hereby incorporated by reference herein.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate with each other and over a network, such as the Internet. IoT may facilitate communication with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold.

Entities within an IoT system may negotiate with one another in order to communicate, use services provided by one of the entities, resolve differences, coordinate actions, or perform other activities that may provide one or both of the entities with some type of advantage. However, direct negotiation between individual IoT entities may not be desirable for several reasons. IoT devices may be resource-constrained devices that have limited processing power, memory, communication capabilities, and/or battery power. Thus, requiring each IoT entity to maintain and generate the detailed information needed to perform negotiation with another device may not be feasible or efficient. One of the entities may be unable or unwilling to negotiate with another entity for various reasons, such as lack of awareness of other IoT entities or lack of the knowledge required to successful negotiate with another entity.

SUMMARY

Embodiments disclosed herein include methods for receiving a negotiation request from a first entity at a negotiation service entity in a network of connected entities, admitting the first entity to the negotiation service entity, and determining a negotiation target entity for the request. A target negotiation request may then be sent to the negotiation target entity and a negotiation response may be received from the negotiation target entity. A negotiation result may be sent to the first entity from the negotiation service.

Embodiments disclosed herein further include a negotiation service entity in a network of connected entities that executes operations including receiving a negotiation request from a first entity, admitting the first entity to the negotiation service entity, and determining a negotiation target entity. The operations may further include transmitting a target negotiation request to the negotiation target entity, receiving a negotiation response from the negotiation target entity, and transmitting a negotiation result to the first entity.

Embodiments disclosed herein further include a negotiation service entity in a network of connected entities that executes operations receiving a negotiation request from a first entity, determining that a past negotiation request has been received from the first entity and that first entity was admitted to the negotiation service entity in response to receiving the past negotiation request, and responsive to determining that the past negotiation request has been received from the first entity and that first entity was admitted to the negotiation service entity in response to receiving the past negotiation request, admitting the first entity to the negotiation service entity. The operations may further include determining a negotiation target entity, transmitting a target negotiation request to the negotiation target entity, receiving a negotiation response from the negotiation target entity, and transmitting a negotiation result to the first entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

A machine-to-machine communications (M2M) functional architecture as described in draft ETSI TS 102 690 1.1.1 (2011-10) and the terms used therein, as well as M2M Interfaces, such as mIa, dIa and mId, as described in draft ETSI TS 102 921 V0.8.2 (2011-09) and the terms used therein, may be used for descriptive purposes herein. The instant disclosure may refer to these drafts and/or use terms as they are understood in this specification to aid in the understanding of the disclosed embodiments. However, one skilled in the art will recognize that the disclosed embodiments may be implemented in other architectures and systems, such as oneM2M and other M2M systems and architectures.

The embodiments set forth herein are described in terms of a representational state transfer (REST) architecture, with components and entities described conforming to the constraints of a REST architecture (RESTful architecture). A RESTful architecture is described in terms of the constraints applied to components, entities, connecters, and data elements used in the architecture rather than in terms of physical component implementation or communications protocols used. Thus, the roles and functions of the components, entities, connecters, and data elements will be described. In a RESTful architecture, representations of uniquely addressable resources may be transferred between entities. One skilled in the art will recognize that implementations of the instant embodiments may vary while remaining within the scope of the present disclosure. One skilled in the art will also recognize that the disclosed embodiments are not limited to implementations using the ETSI M2M architecture that is used herein to describe exemplary embodiments. The disclosed embodiments may be implemented in other architectures and systems, such as oneM2M and other M2M systems and architectures.

Figure 1:
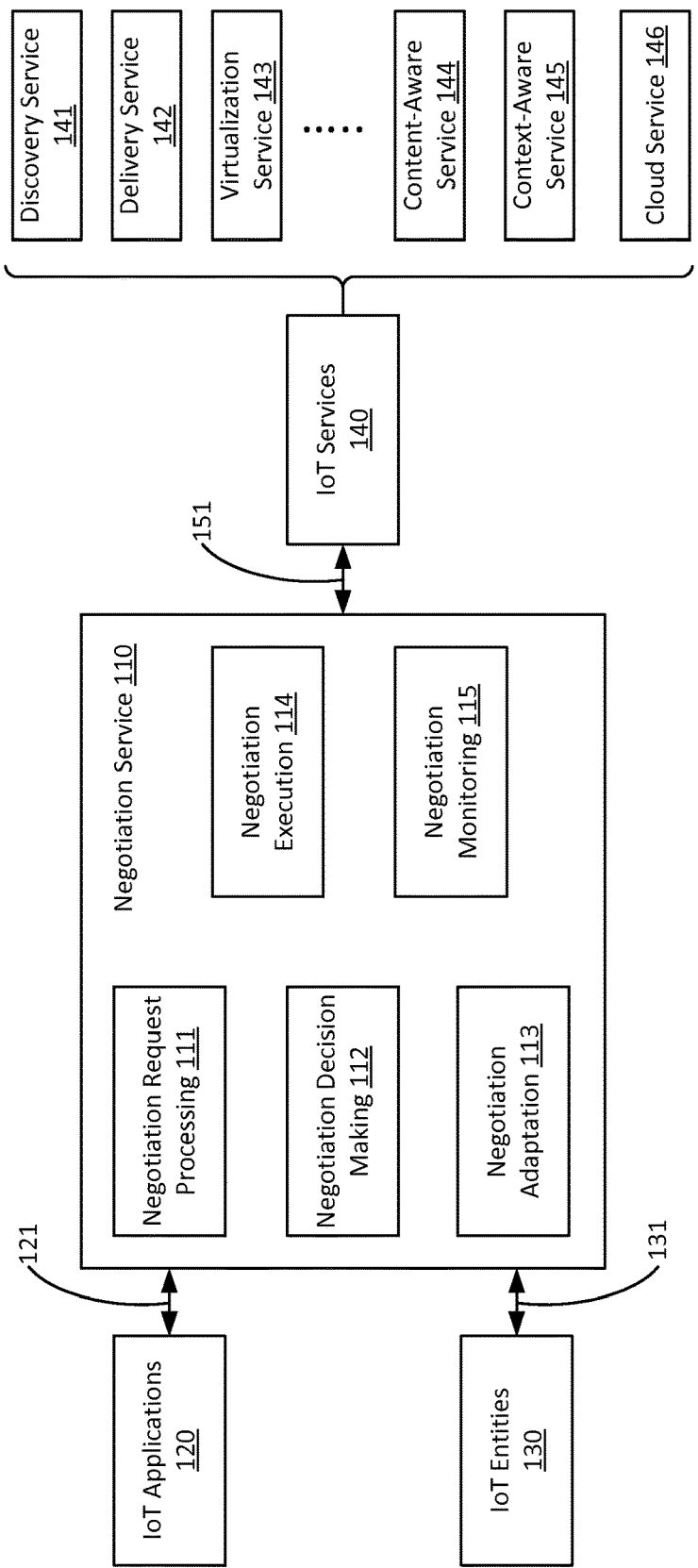
FIG. 1 illustrates an exemplary IoT architecture in which intelligent negotiation service may be implemented according to an embodiment.

In an embodiment, a negotiation service architecture may be used to facilitate negotiations between IoT entities. Such negotiations may be used to determine various interactions between IoT entities, such as how to provide IoT services by one entity to another, etc. IoT entities may negotiate with one another to determine how and when to provide services to one another. For example, negotiations may be used to determine a working schedule for entities, determine appropriate entities to provide a service, obtain data (e.g., periodically), etc. FIG. 1 illustrates exemplary negotiation service 110 and functions that may be associated therewith. These functions may assist in providing negotiation services for IoT entities, IoT services, and IoT applications. Each of these functions may communicate with each other function and any other function implemented negotiations service 110.

Among the functions that may be provided by negotiation service 110 may be negotiation request processing function 111 that may receive negotiation requests from IoT entities 130, IoT applications 120, and/or other IoT services 140. IoT services 140 may include, but are not limited to, discovery service 141 that may determine and return information on IoT entities that are available to provide services, delivery service 142 that may facilitate and/or deliver services, virtualization service 143 that may virtualize entity resources so that they may be used by other IoT entities, content-aware service 144 that may provide content copies, content quality, and content format, context-aware service 145 that may provide context information about IoT entities that may be used by IoT entities, and cloud service 146 that may provide cloud computing services. Negotiation request processing function 111 may conduct admission control for incoming negotiation requests, buffer and prioritize accepted incoming requests, adjust priorities of negotiation requests, and schedule negotiation requests based on their respective priorities and/or policies.

Another function that may be provided by negotiation service 110 may be negotiation decision making function 112 that may include a cognition capability that enables it to make negotiation decisions, such as determining a destination for a negotiation request (e.g., received from negotiation request processing function 111), determining a best strategy for negotiation, and other negotiation decisions. Such decisions may be made based on available or obtainable data, including data such as context and content related data, policies, etc.

Another function that may be provided by negotiation service 110 may be negotiation adaptation function 113 that may use real-time monitoring results (e.g., received from negotiation monitoring function 115), to determine how to adapt a negotiation to current conditions. For example, negotiation adaptation function 113 may terminate a strategy that resulted from the previous negotiation (e.g., as determined by negotiation decision making function 112), reevaluate a current negotiation, form a new negotiation strategy, and re-negotiate with newly determined parties.

Another function that may be provided by negotiation service 110 may be negotiation execution function 114 that may execute negotiation decisions such as the decision to send a negotiation request to a chosen negotiation party (e.g., as determined by negotiation decision making function 112) with a determined negotiation strategy (e.g., as determined by negotiation decision making function 112).

Yet another function that may be provided by negotiation service 110 may be negotiation monitoring function 115 that may monitor a negotiation strategy execution (e.g., as executed by negotiation execution function 114) to ensure that the negotiating parties are satisfied by monitoring whether the requester achieves its negotiation goal with the determined strategy and use the feedback to improve the negotiation service.

In an embodiment, negotiation service 110 may include a cognition capability or artificial intelligence that builds and maintains knowledge of actions to take based on analyzing content, situational contexts, and policy information. Such a cognition capability may learn from past situations, observations, decisions, and actions, and use this knowledge to make future decisions. Negotiation service 110's cognition capability may rely on a cognition model that approximates human cognition processes. This cognition model may define the scope of comprehension and decision making (i.e., knowledge) functionalities. Negotiation service 110's cognition capability may be used by negotiation request processing function 111 to determine negotiation request admission, by negotiation decision making function 112 to determine negotiation parties and a negotiation strategy, by negotiation adaptation service 113 to determine negotiation adaptation, and by any other negotiation service function to perform any other determinations or other analysis.

Negotiation service 110 may use various interfaces to interact with IoT services, IoT entities, and IoT applications. For example, interface 121 may be used to receive negotiation requests from IoT applications 120 that may trigger new negotiation, negotiation monitoring, and/or negotiation adaptation by the associated negotiation functions. Interface 131 may be used to receive negotiation requests from IoT entities 130 that may also trigger new negotiation, negotiation monitoring, and/or negotiation adaptation by the associated negotiation functions.

In an embodiment, interface 151 may be used by negotiation service 110 to interact with various IoT services. For example, negotiation service 110 may interact with discovery service 141 to determine other services, such as content-aware service 145, context-aware service, virtualization service 143, etc. Interface 151 may also be used to discover service providers that may offer a same service or parts of a service that may be involved in collaboration and negotiation.

Interface 151 may also be used by negotiation service 110 to interact with delivery service 142 to negotiate with service providers providing services on particular duty schedules For example, delivery service 142 may interact with negotiation service 110 via interface 151 to ensure that when a service is being requested, it is delivered by an on-duty service provider. Interface 151 may also be used for interaction with delivery service 142 to negotiate with service providers that are in competition but providing the same service, for example by negotiating a price and other service delivery related quality of service (QoS) parameters and determine the service that is going to deliver the service to the requesters. Interface 151 may also be used for interaction with delivery service 142 to negotiate among en-route nodes (i.e., nodes on the path between the service provider and the service requester) so that the en-route nodes are willing to deliver parts of the services and assist in providing the complete service.

Interface 151 may also be used by negotiation service 110 for interaction with virtualization service 143 to negotiate access to a virtualized IoT object hosted on an IoT service, negotiate the mirroring of a virtualized IoT object onto another IoT service, negotiate the offloading and/or migration of a virtualized IoT object from one IoT service to another, negotiate with an IoT service to adapt a virtualized IoT object to meet IoT application's requirements, and to negotiate the applicable policies to determine whether and/or when to virtualize an entity or a service.

Interface 151 may also be used by negotiation service 110 for interaction with content-aware service 144 to leverage content copies, content quality, and content format. For example, one of IoT entities 130 may request that compatible content services be delivered to it from other IoT entities. Compatibility may be determined, by the IoT entity or by negotiation service 110, based on local content of the IoT entity and/or awareness of the IoT entities that provide content services compatible with the local content of the IoT entity. Once compatibility is determined, compatible content services may be determined, again by either the IoT entity or by negotiation service 110, and the IoT entity may request that compatible content services be delivered to it from the determined IoT entity or entities providing the compatible service. Negotiation service 110 may, on behalf of the requesting IoT entity, negotiate with the determined IoT entity or entities providing the compatible service on the content quality, content format, and/or content price. Further negotiations may include negotiating on the entity that is to deliver the content based on a variety of factors, such as service load and distance from the requesting IoT entity. Based on content awareness, one or more intermediate IoT entities in the network may cache or store content. The intermediate IoT entities may negotiate on which entity will cache the content based on the available storage of the entities to improve storage efficiency.

Interface 151 may further be used by negotiation service 110 for interaction with context-aware service 145. Context information may be used by IoT entities and IoT services to negotiate the services that may be made accessible to one another. For example, if a first entity of IoT entities 130 is aware that a second entity of IoT entities 130 is located in a remote location in the network that is closer to a third entity of IoT entities 130, and the third entity offers the same type of service as the first entity, the first entity may deny the service to the second entity and inform the second entity that the third resides closer to it and offers the same service.

Context information may also be used by IoT entities hosting the same service to negotiate with one another about when each will make this service available to other IoT entities in the network. By doing so, the IoT entities may coordinate and schedule their services and thereby minimize redundant services and the load on each of the IoT entities hosting the same service. For example, if both a first IoT entity and a second IoT entity of IoT entities 130 host a first service, the first IoT entity may publish or otherwise announce that it hosts the first service to the second IoT entity. The second IoT entity may then in turn send negotiation messages to the first IoT entity to inform the first IoT entity that it is available and provide its preferred service schedule for the first service. The IoT entities hosting the first service may also announce or publish their respective service loads to other entities hosting the first service. The IoT entities hosting the first service may exchange messages or otherwise interact such that they reach an agreement on a schedule of when each IoT entity can provide first service to other IoT entities in the network requesting the service. Note negotiation service 110 may adapt based on changes in the context for a service.

Interface 151 may further be used by negotiation service 110 for interaction with cloud service 146 to support cloud-to-host negotiation strategies and to negotiate with IoT entities for QoS and price.

In an embodiment, an IoT entity may request admission to a negotiation service. Such a negotiation request may take any of several forms. In an embodiment, a negotiation request may be a request for admission to a negotiation service with a negotiation goal included in the request.

Alternatively, a negotiation request may be a request for a negotiation service to select and return one or more appropriate negotiation party(s). After the requesting IoT entity (may be referred to herein interchangeably as "requester") receives the negotiation party information from the negotiation service, it may determine whether to request that the negotiation service carry out the negotiation process on its behalf, to negotiate with negotiation party on its own, or forego the negotiation.

In another embodiment, a request may be a request for a negotiation service to select and return an appropriate negotiation strategy. After the requester receives the negotiation strategy information, it may determine whether to request that the negotiation service carry out the negotiation process on its behalf, to negotiate with negotiation party on its own, or forego the negotiation.

In another embodiment, a request may include an indication that the requester will rely on the negotiation service to carry out the negotiation on its behalf. The negotiation service may then proceed to select a negotiation party and negotiation strategy and negotiate with a selected negotiation party using the selected strategy to reach an agreement on behalf of the requester.

In another embodiment, a request may include an indication that the requester is willing to follow a generalized negotiation result that the negotiation service has summarized from past similar negotiation scenarios involving the requester.

In yet another embodiment, request may include an indication that the requester would like to follow another negotiation requester's negotiation strategy that the negotiation service may have stored. The other requester may be an IoT service, an IoT entity, or an IoT application.

In an embodiment, a request may include subscription information that may allow a requester to subscribe to the negotiation service for the purposes of having negotiation notifications sent to the subscription requester if or when one or more specified conditions are met. Subscription information in such a request may include conditions (e.g., policies) for which the IoT negotiation service is to trigger a negotiation notification. Alternatively, there may be no condition information in the subscription request.

Figure 2:
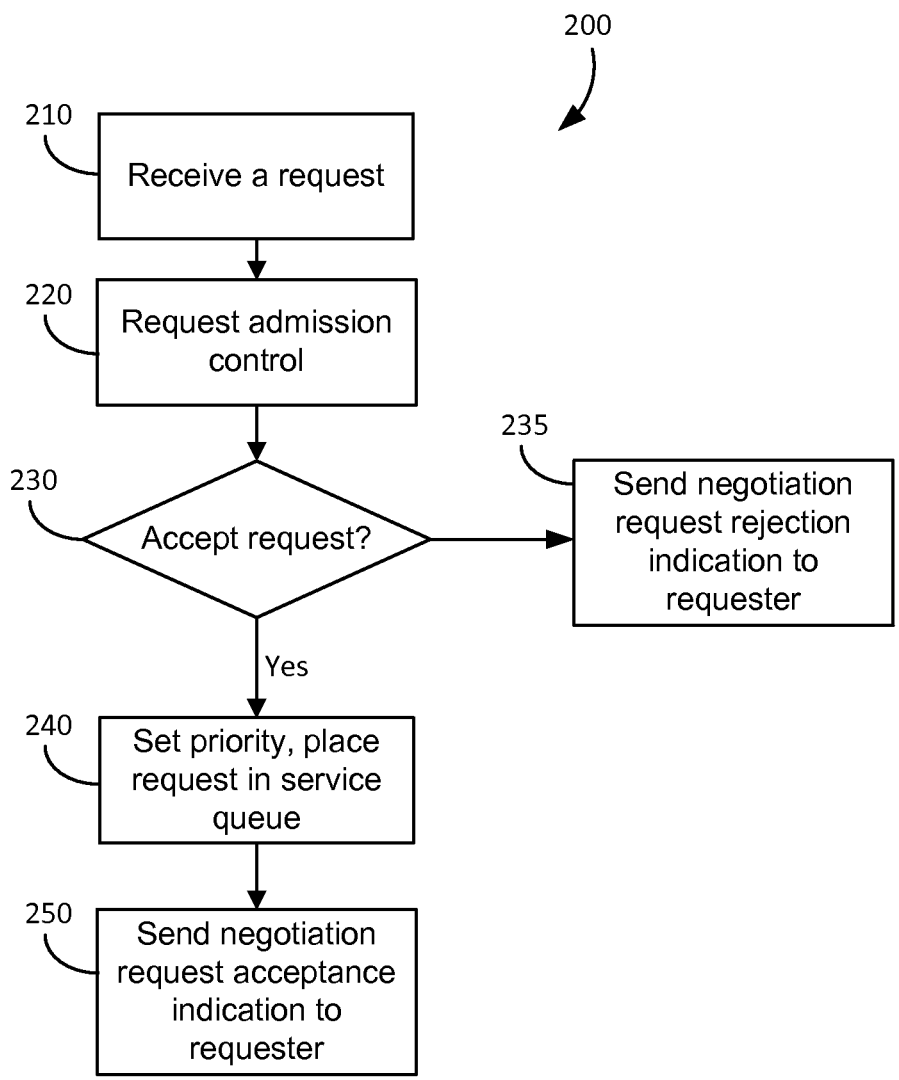
FIG. 2 illustrates an exemplary method of implementing intelligent negotiation service according to an embodiment.

FIG. 2 illustrates exemplary admission request process 200 that may be performed by a negotiation service and/or an entity executing or hosting such a service upon receipt of a negotiation request. Note that any of the functions, activities, and processes described in regard to FIG. 2 and any other processes or methods disclosed herein may be performed in any order, in conjunction with any other functions, activities, and processes, and in isolation. Any subset of the functions, activities, and processes described in regard to FIG. 2 and any other processes or methods disclosed herein may performed without performing the remaining functions, activities, and processes described. All such embodiments are contemplated as within the scope of the present disclosure.

At block 210, a negotiation request may be received at a negotiation service from an IoT entity. At block 220, request admission control may be performed, as set forth in more detail in FIGS. 3 and 4 and associated text. At block 230, it may be determined whether the request is to be accepted or not. If the request is not accepted, at block 235 a response may be sent to the requesting entity indicating that the request has been rejected. If the request is accepted, at block 240 apriority may be determined for the request and the request may be placed in a service queue for service by the negotiation service. At block 250 a response may be sent to the requesting entity indicating that the request has been rejected.

Figure 3:
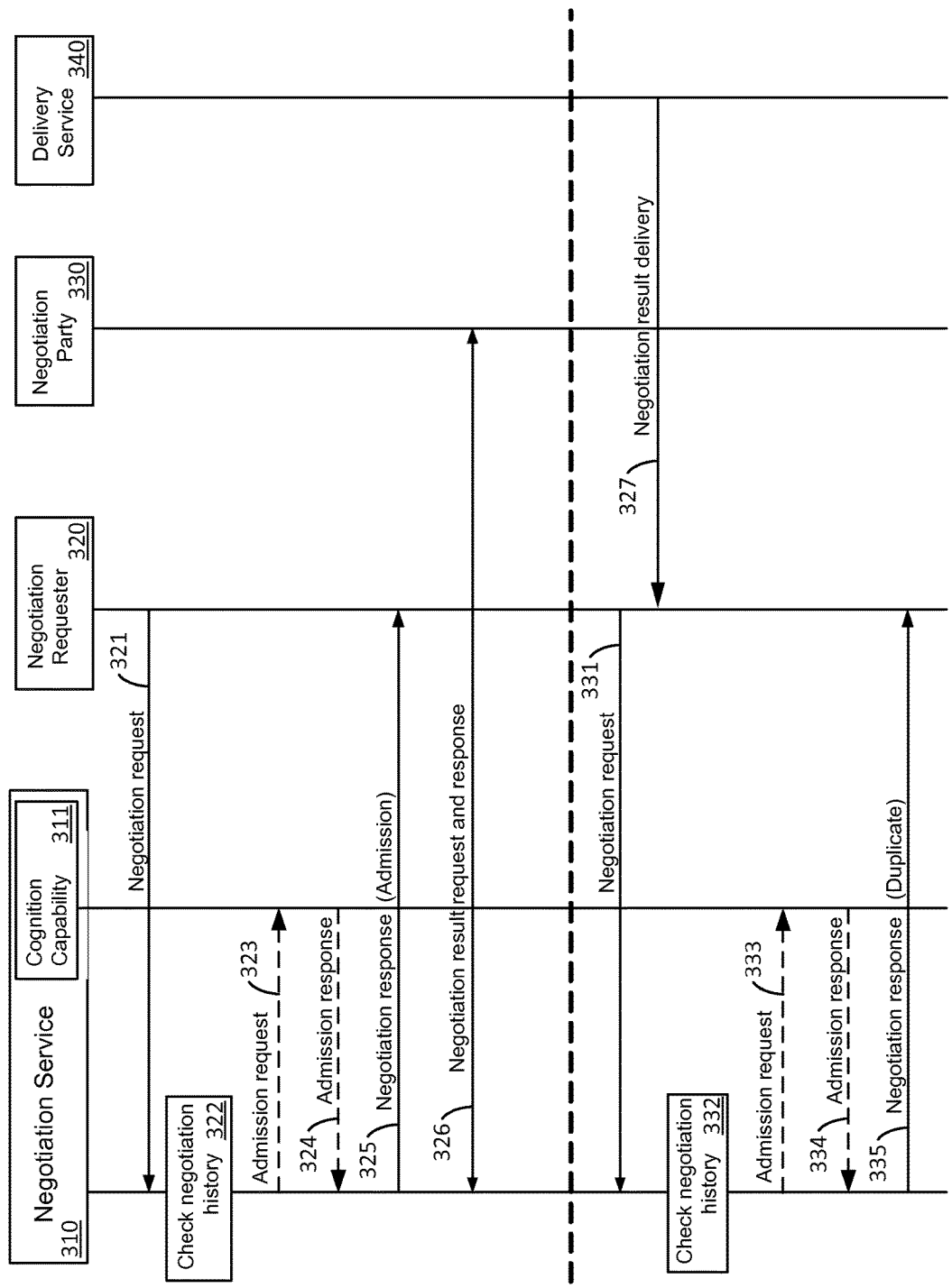
FIG. 3 illustrates an exemplary intelligent negotiation service signal flow according to an embodiment.

FIG. 3 illustrates exemplary signal flow 300 that may be used in some embodiments during a negotiation request admission process. In an embodiment, negotiation service 310 may include cognition capability 311. Negotiation service 310 may selectively accept negotiation requests from IoT entities, IoT services, and IoT applications. Negotiation service 310 may maintain a history of past requests and the associated negotiation results. Negotiation service 310 may leverage the stored history of past requests and results to determine whether to admit a negotiation request.

In one example, negotiation requester 320 may send negotiation request 321 to negotiation service 310. Negotiation service 310 may check the request against a stored history of requests and negotiations at block 322 and determine that it does not have a same or similar request from negotiation requester 320. Negotiation service 310 may check negotiation requester 320 against access rights configured on it that may allow only a certain individual or groups of authorized entities, applications, or services to be admitted to use the negotiation service. Such access rights may be configured at negotiation service 310 as a list of allowed entities, applications, or services (a "white list"), a list of blocked entities, applications, or services (a "black list"), or a combination thereof. Any other form of limiting access to a negotiation service is contemplated as within the scope of the present disclosure.

Upon determining the negotiation service 310 does not have a history of requests from negotiation requester 320, negotiation service 310 may provide an admission request 323 to cognition capability 311 for a determination of whether to admit negotiation requester 320 to the negotiation service. This request may contain all, some, or none of the data included in negotiation request 321. Cognition capability 311 may make a determination as to whether to admit negotiation requester 320 using any criteria and methods, including those set forth herein. Upon making the admission determination, cognition capability 311 may provide admission response 324 to negotiation service 310.

If negotiation requester 320 is to be permitted to use negotiation service 310, negotiation response 325 indicating admission to the negotiation service may be transmitted to negotiation requester 320. Negotiation may then be performed as disclosed herein at 326 between negotiation service 310 and negotiation party 330. Note that negotiation party 330 may be the same entity as delivery service 340 or negotiation party 330 may be a separate entity authorized to negotiate on behalf of delivery service 340, such as another negotiation service.

Before negotiation requester 320 receives the requested service, it may send a duplicate negotiation request 331 to negotiation service 310 that is substantially the same as negotiation request 321. Negotiation service 310 may check the request against a stored history of requests and negotiations at block 332 and determine that it received negotiation request 321 from negotiation requester 320 earlier and that negotiation request 321 is substantially the same as negotiation request 331. Negotiation service 310 may also provide another admission request 333 to cognition capability 311 for a determination of whether to admit negotiation requester 320 to the negotiation service and may receive admission response 334. Upon determining that negotiation request 331 is a duplicate request, negotiation service 310 may transmit negotiation response 335 indicating rejection of the negotiation request to negotiation requester 320. Meanwhile, negotiation requester 320 may have begun to receive the service requested at 327.

A negotiation service may place admitted negotiation requests in a service queue to await negotiation services. However, a service queue may become full due to limitations or a configuration of the negotiation service. The negotiation service may prioritize negotiation requests based on the urgency or priority of the negotiation. For example, the negotiation between an emergency event publishing requester and a publishing service may be given higher priority than other requests for negotiation with the publishing service. Along with defining the order of service of negotiation requests, a service queue may also determine the manner in which negotiation requests will be served.

Figure 4:
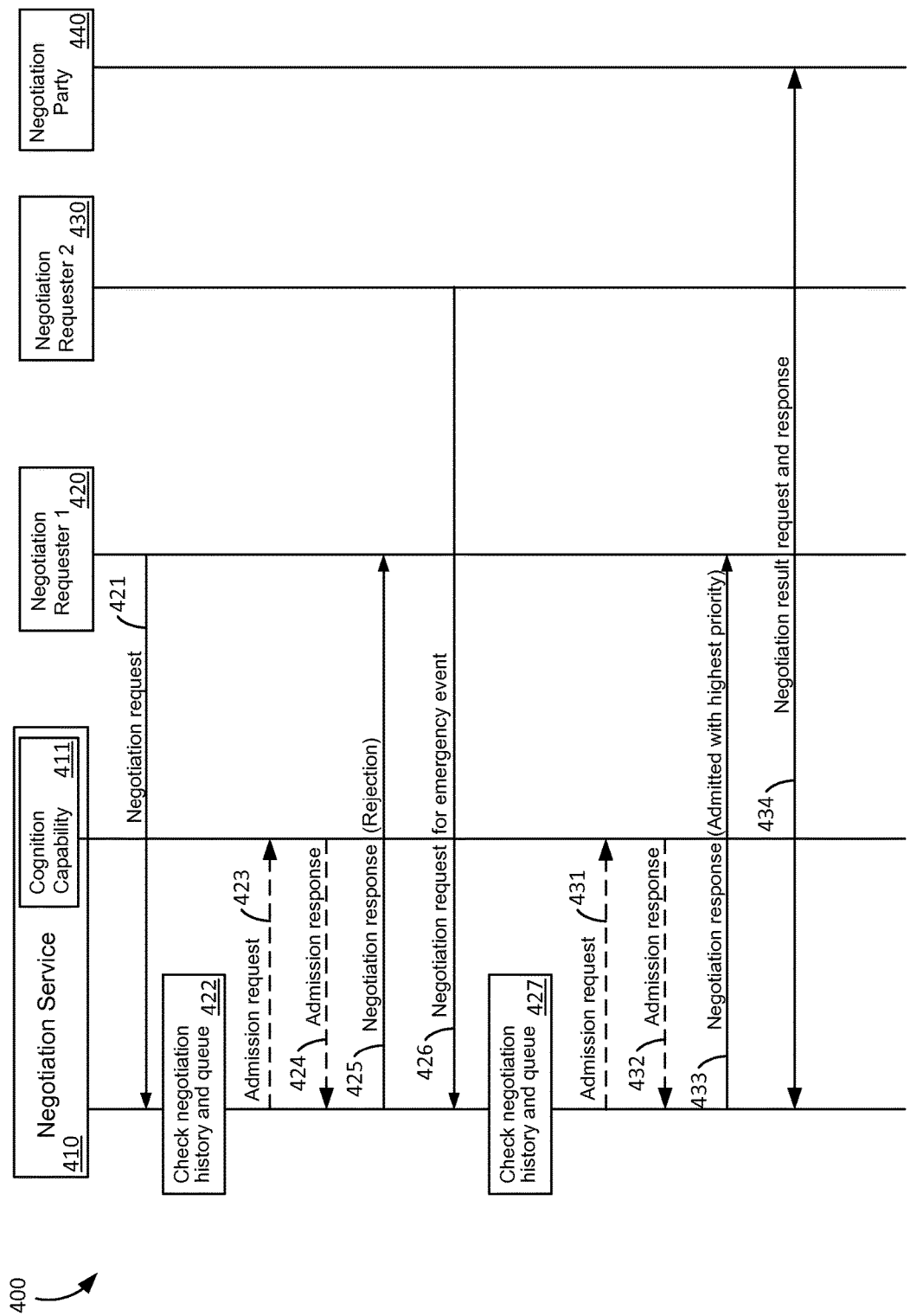
FIG. 4 illustrates an exemplary intelligent negotiation service signal flow according to an embodiment.

FIG. 4 illustrates exemplary signal flow 400 that may be used in some embodiments during a negotiation request admission process. In an embodiment, negotiation service 410 may include cognition capability 411. Negotiation service 410 may selectively accept negotiation requests from IoT entities, IoT services, and IoT applications. Negotiation service 410 may maintain a history of past requests and the associated negotiation results as well as priorities associated with particular or groups of IoT entities, IoT services, and IoT applications.

In one example, negotiation requester 420 may send negotiation request 421 to negotiation service 410. Negotiation service 410 may check the request against a stored history of requests as described above, any access rights configured at negotiation service 410, and against a service queue to determine if the request may be serviced at block 422. This may be performed by providing admission request 423 to cognition capability 411 for a determination of whether the service queue's current state will allow admission of negotiation requester 420 to the negotiation service. This request may contain all, some, or none of the data included in negotiation request 421. Cognition capability 411 may provide admission response 424 to negotiation service 410. In this example, admission response 424 may indicate that negotiation requester 420 is not allowed to be admitted at this time. Negotiation response 425 may then be sent to negotiation requester 420 indicating that negotiation request 421 is rejected.

Negotiation requester 430 may then send negotiation request 426 to negotiation service 410. Negotiation request 426 may have a higher priority than that of negotiation request 421. This priority may be indicated in negotiation request 426 and/or may be based on the services provided by negotiation requester 430. Negotiation service 410 may check the request against a stored history of requests as described above, any access rights configured at negotiation service 410, and against a service queue to determine if request 426 may be serviced at block 427. This may be performed by providing admission request 431 to cognition capability 411 for a determination of whether the service queue's current state will allow admission of negotiation requester 430 to the negotiation service. This request may contain all, some, or none of the data included in negotiation request 426. Cognition capability 411 may provide admission response 432 to negotiation service 410. In this example, admission response 432 may indicate that negotiation requester 430 is allowed to be admitted at this time. This may be based on the emergency status or priority of request 426 and/or negotiation requestor 430. Negotiation response 433 may then be sent to negotiation requester 430 indicated that negotiation request 426 is allowed. Negotiation response 433 may indicate that negotiation requester 430 has been given a high priority. Negotiation may then be performed as disclosed herein at 434 between negotiation service 410 and negotiation party 440.

Figure 5:
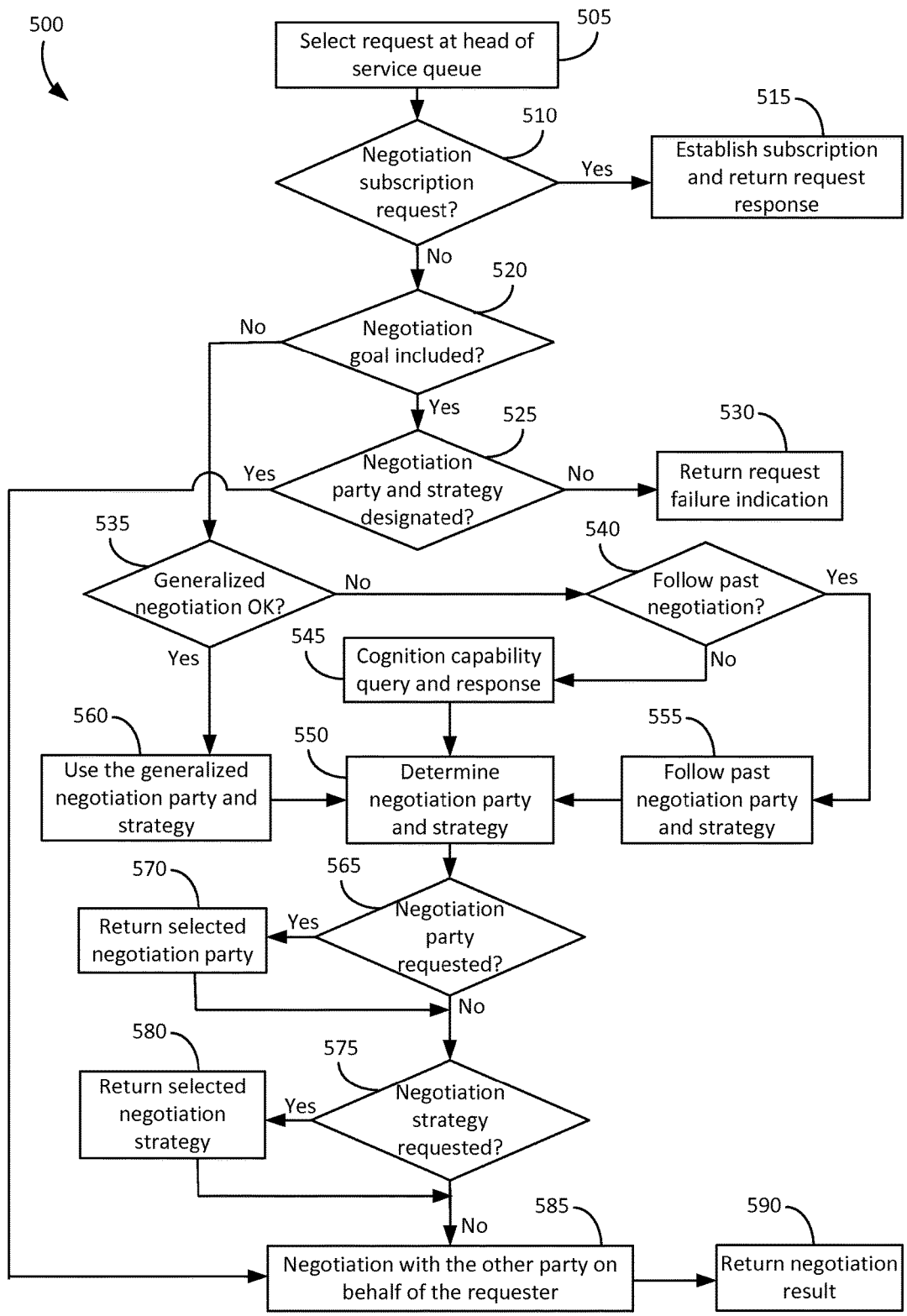
FIG. 5 illustrates an exemplary method of implementing intelligent negotiation service according to an embodiment.

Upon determining that a negotiation request is ready to be service, i.e., it has been admitted and is now at the head of the service queue, the negotiation service process may begin. FIG. 5 illustrates exemplary process 500 for servicing a negotiation request. At block 505, a negotiation service may select the negotiation request that is at the head of its service queue. At block 510, the negotiation service may determine if the request is a subscription request. If so, the negotiation service may, at block 515, establish the subscription and notification conditions as described in more detail herein. A response may also be sent to the requester indicating the success or failure of the subscription establishment.

If the request is any other type of negotiation request, the validity of the request may be verified by determining whether the request includes a negotiation goal at block 520. If there is no negotiation goal specified in the request, at block 525 the negotiation service may determine whether the negotiation party and/or strategy are provided in the negotiation request. If not, at block 530 a rejection message may be sent to the requester indicating that the request has been denied. The reason for the rejection may be indicated in the rejection message.

If it is determined at block 525 that the negotiation party and strategy are designated by the requester, the negotiation service performs the negotiation on behalf of the requester at block 585.

Referring again to block 520, if the request does not include a negotiation goal (e.g., target negotiation party and/or strategy), then at block 535 a determination may be made as to whether the requester is willing to use a generalized negotiation strategy summarized by the negotiation service from the past similar negotiation scenarios as described in more detail herein. An indication of acceptance of a generalized negotiation strategy and/or target party may be included in the request, or may be assumed if the request fails to include a negotiation goal. If the requester is willing to use a generalized negotiation strategy, the negotiation service at block 560 uses the generalized negotiation strategy and party and does not need to query its cognition capability to determine the negotiation party and strategy for this request at block 550.

If, at block 535, it is determined that the requester is not willing to use a generalized negotiation strategy, then at block 540 a determination is made as to whether past negotiations may be used. This may include using a certain peer IoT application, entity, or service's negotiation strategy. If so, at block 555 the negotiation service determined the past negotiation strategy and party and uses them at block 550 as the determined negotiation party and strategy. If, at block 540, a determination is made that past negotiations may not be used, at block 545 the negotiation service queries its cognition capability to determine the negotiation party and strategy for the request uses the determined negotiation party and strategy at block 550.

After the negotiation service determines the negotiation party and strategy, it may determine whether the requester requires it to carry out the negotiation on the requester's behalf. This process begins with block 565, where the negotiation service determines whether the requester requests a negotiation party. If so, the determined negotiation party is sent to the requester. Note, that if the negotiation party is the only information that the requester requested, the negotiation service may not use the cognition capability and may skip block 545 where a negotiation strategy would otherwise be determined.

If the requester requests the negotiation strategy as determined at block 575, the determined negotiation strategy may be provided to the requester at block 580. Note, that if the negotiation strategy is the only information that the requester requested, the negotiation service may not use the cognition capability and may skip block 545 where a negotiation party would otherwise be determined Note also that the requester may request the strategy and party in order to carry out the negotiation on its own, and in such an embodiment the process of FIG. 5 may be complete. If the requester wants the negotiation service to carry out the negotiation on its behalf, the negotiation is performed by the negotiation service at block 585 and a result of the negotiation is provided to the requester at block 590.

Figure 6:
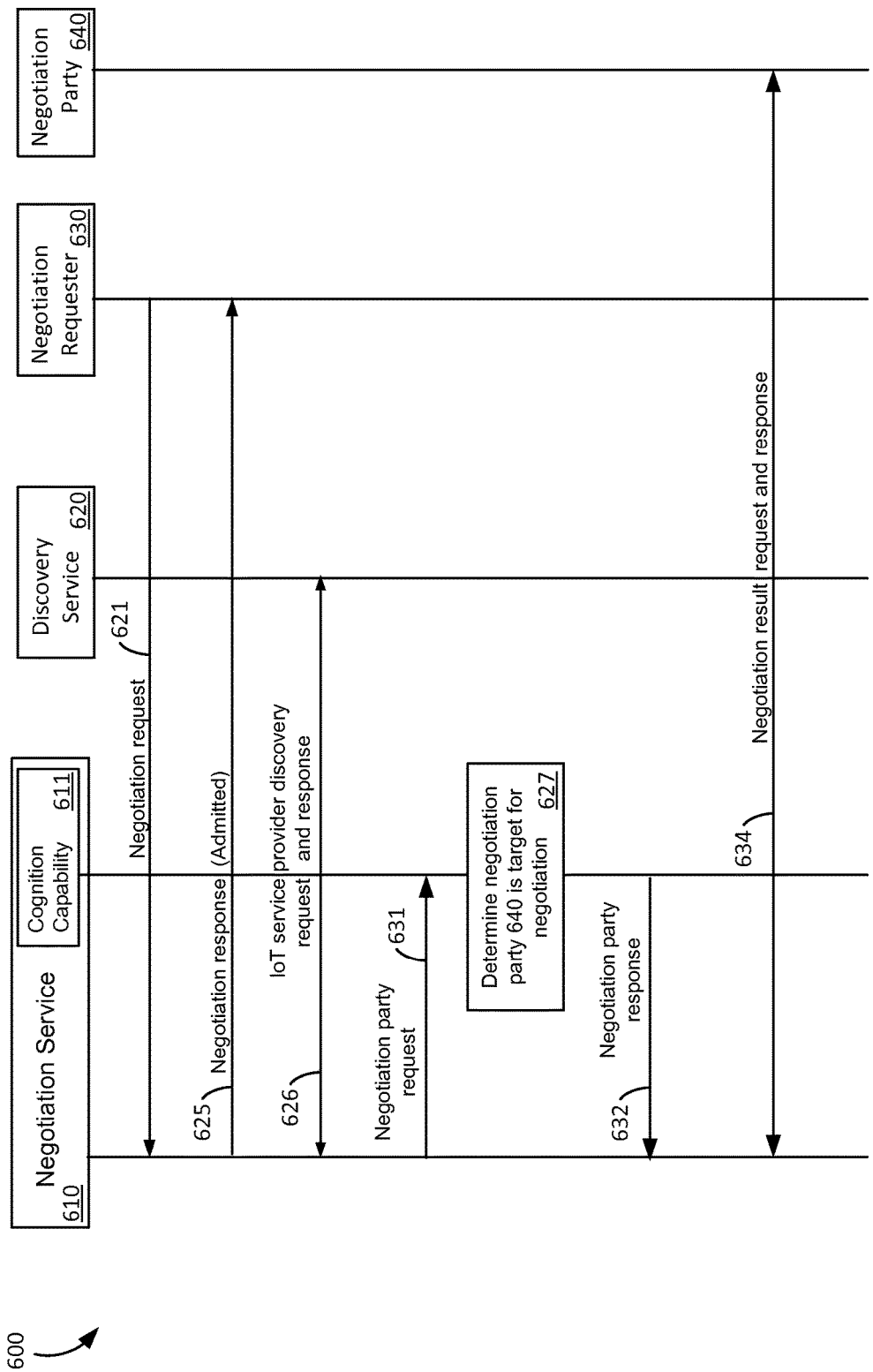
FIG. 6 illustrates an exemplary intelligent negotiation signal flow according to an embodiment.

FIG. 6 illustrates exemplary signal flow 600 that may be used in some embodiments to determine a negotiation party. In an embodiment, negotiation service 610 may include cognition capability 611. In one example, negotiation requester 630 may send negotiation request 621 to negotiation service 610. Upon determining that the request is to be allowed, negotiation response 625 may be sent to negotiation requester 630 indicating that negotiation request 621 is accepted.

In an embodiment, request 621 may include an indication of the party with which requester 630 would like negotiation service 610 to negotiation on its behalf. If request 621 does not include an indication of negotiation party, at 626 the negotiation service may initiate a request to discovery service 620 to discover the IoT entities that provide the requested IoT service. The negotiation service may then request at 631 that the cognition capability determine at 627 the IoT entity from the discovery results that is to serve as the negotiation party. The determined negotiation party is returned at 632, and negotiation may then be performed as disclosed herein at 634 between negotiation service 610 and negotiation party 640.

Figure 7:
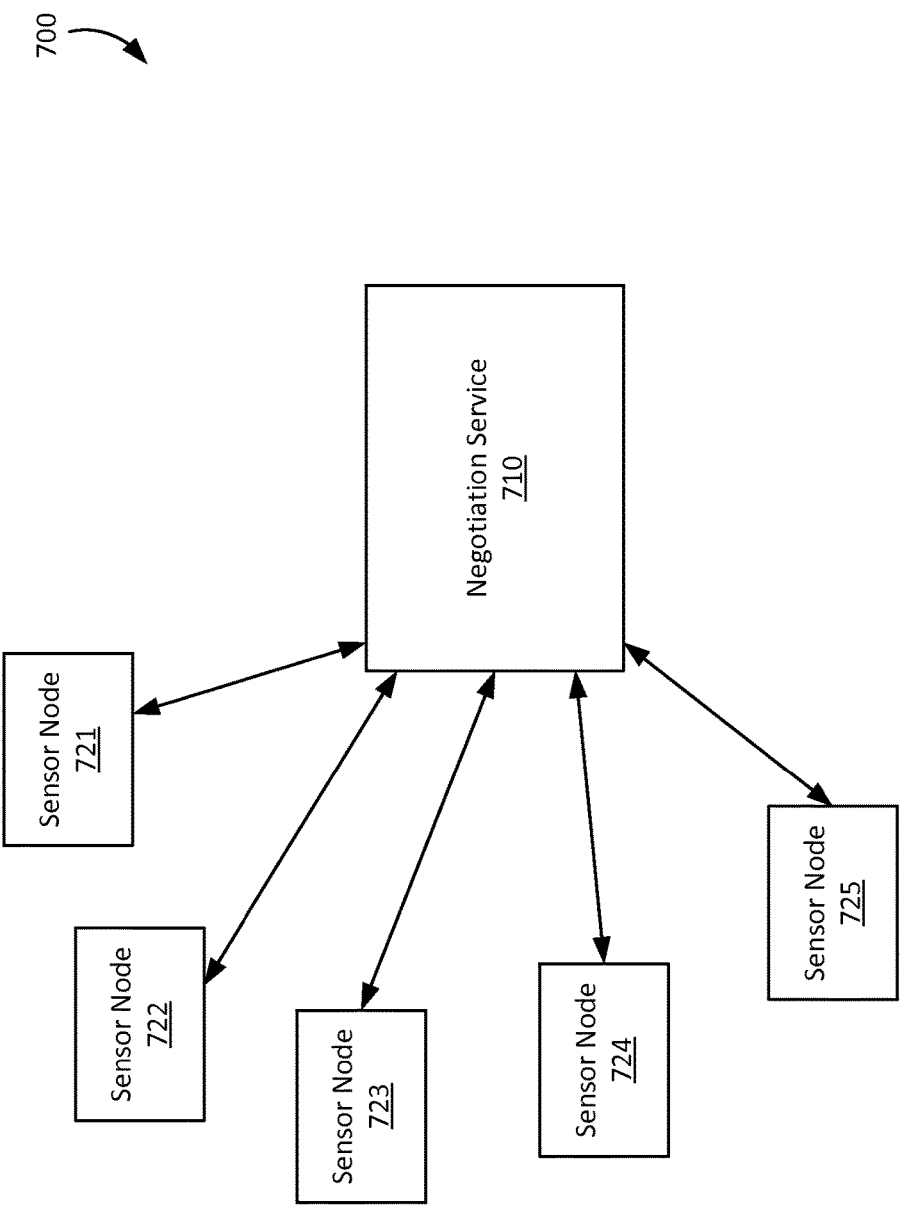
FIG. 7 illustrates an exemplary IoT intelligent negotiation configuration according to an embodiment.

A negotiation service may control the negotiation strategy on behalf of a negotiation requester. A strategy may be determined from the request received from the requester if it is provided therein. Alternatively, a negotiation service may use its cognition capability to determine a strategy based on the contexts of IoT service providers and the requester, such as available resources for either entity (e.g., processing capability, memory, bandwidth, etc.), online and offline schedules for either entity, etc. FIG. 7 illustrates exemplary sensor node and negotiation service configuration 700. In this embodiment, each of sensor nodes 721-725 may be any type of sensor node, such as light sensors, temperature sensors, motion detectors, etc. The coverage areas of these sensor nodes may overlap such that they do not all need to be operating at the same time to provide full detection of a coverage area. Therefore, the sensor nodes may desire to negotiate a schedule of when each sensor nodes will be on and off that ensures that there is still full detection of a coverage area. Rather than each sensor nodes negotiating directly with each other sensor nodes, requiring four negotiation sessions per sensor, sensor nodes 721-725 may use negotiation service 710 and have a single negotiation session per sensor. In an embodiment, the negotiation process may be initiated when sensor node 701 sends a negotiation request with a designated negotiation party (e.g., one of the other sensor nodes, such as sensor node 702) and a negotiation strategy (e.g., achieve lowest coverage redundancy).

Figure 8:
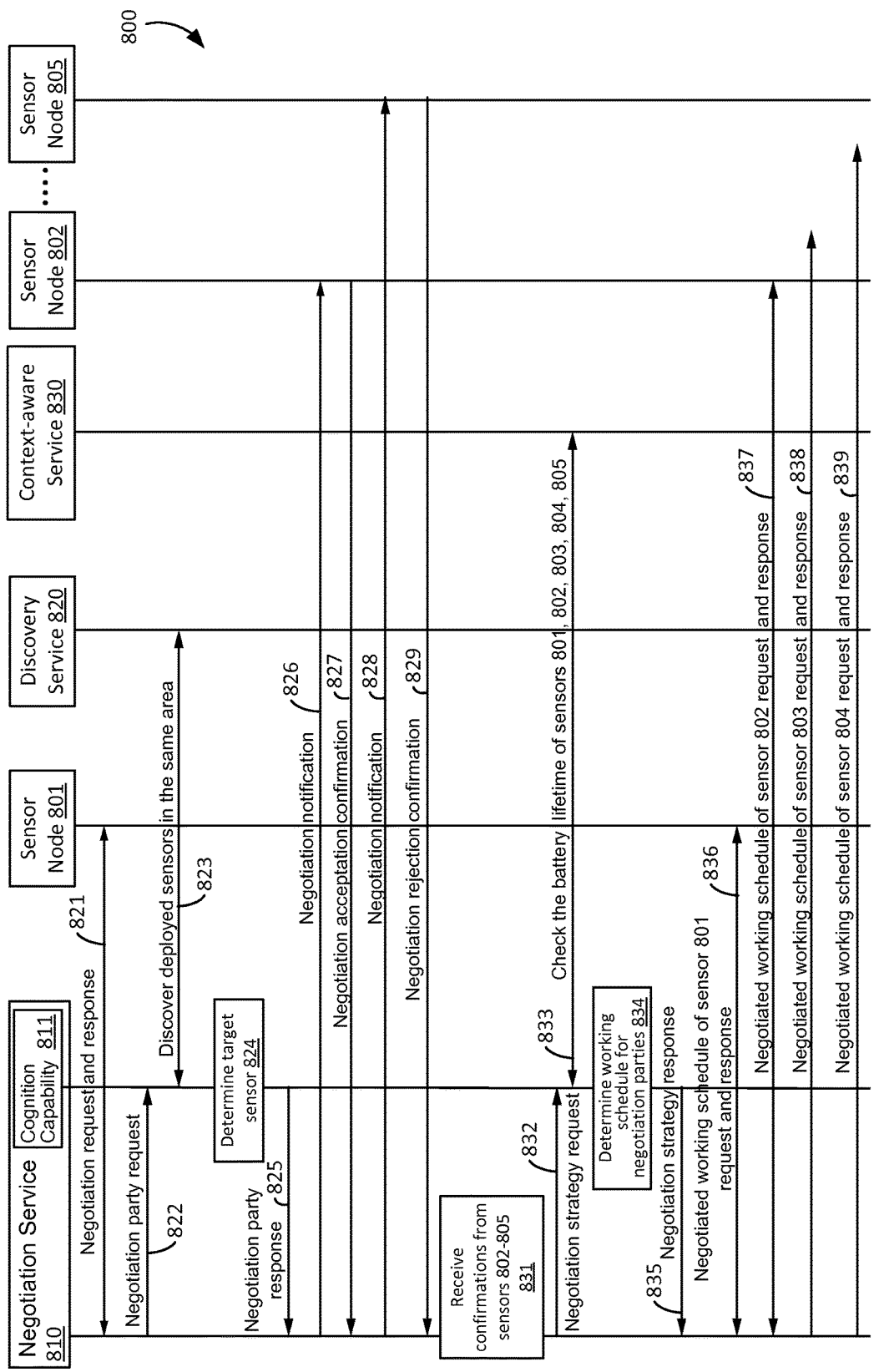
FIG. 8 illustrates an exemplary intelligent negotiation signal flow according to an embodiment.

FIG. 8 illustrates exemplary signal flow 800 that may be used in some embodiments to determine a negotiation strategy that may, for example, address the needs of situations such as that described in regard to FIG. 7. In an embodiment, negotiation service 810 may include cognition capability 811. Negotiation service 810 may receive a negotiation request from sensor node 801 and may send a response at 821. Negotiation service 810 may request cognition capability 811 determine the parties of the negotiation at 822. Negotiation service 810, in an embodiment via cognition capability 811, may request that discovery service 820 return a listing of the neighboring sensor nodes in the same area as the sensor node 1 and may receive the requested listing at 823. In this example, the other sensor nodes in the same area are sensor nodes 802, 803, 804, and 805. Based on this listing, cognition capability 811 may determine that sensor nodes 802-805 are the target sensor nodes at 824 and may provide this information to negotiation service 810 at 825.

Instead of sending a negotiation notification only to sensor node 802 as the request at 821 indicated, negotiation service 810 sends negotiation notification 826 to sensor node 802 and receives response 827, negotiation notification 828 to sensor node 805 and receives response 829, and so forth for each sensor in the same area as sensor node 801. Each of the sensor nodes may reject the negotiation notification because its battery level is low, etc., or it may not respond because it is in a sleep mode. For example, sensor nodes 802, 803, and 804 may return the negotiation acceptance confirmation, while the sensor node 805 may refuse to join the negotiation by sending the negotiation rejection confirmation. The acceptance and rejection confirmations may be used at 831 by negotiation service 810 to determine the involved negotiators. At 832, negotiation service 810 may provide this information to cognition capability 811 with a request to determine strategy.

To determine an improved strategy for negotiation among sensor nodes 801-804, context-aware service 830 may be requested by cognition capability 811 at 833 to provide the battery lifetimes for each of the four sensor nodes. Based on this context information and the goal of the negotiation, cognition capability 811 may determine at 834 a strategy that includes a schedule for distributing the work of the nodes among the four sensor nodes that provides at least the minimum redundancy of coverage by the nodes for the area in which they are configured. Such a negotiation strategy is later sent to the sensor node 1, 2, 3, 4 for confirmation. The strategy may be provided in response 835 to negotiation service 810. At 836, negotiation service 810 may send sensor node 801's working schedule to that node and receive confirmation of receipt from that node. Likewise, at 837, 838, and 839, negotiation service 810 may send and the working schedule for sensor nodes 802, 803, and 804, respectively, receiving a response from each.

A negotiation service may be adjusted due to a policy change or a context change. Negotiation service policies may be dynamically adjusted based on context, software defined settings, input from other services, and any other criteria and conditions. Because policies may be dynamic, in an embodiment, negotiation determinations and parameters may also be dynamically adjusted to address changes in policies.

Figure 9:
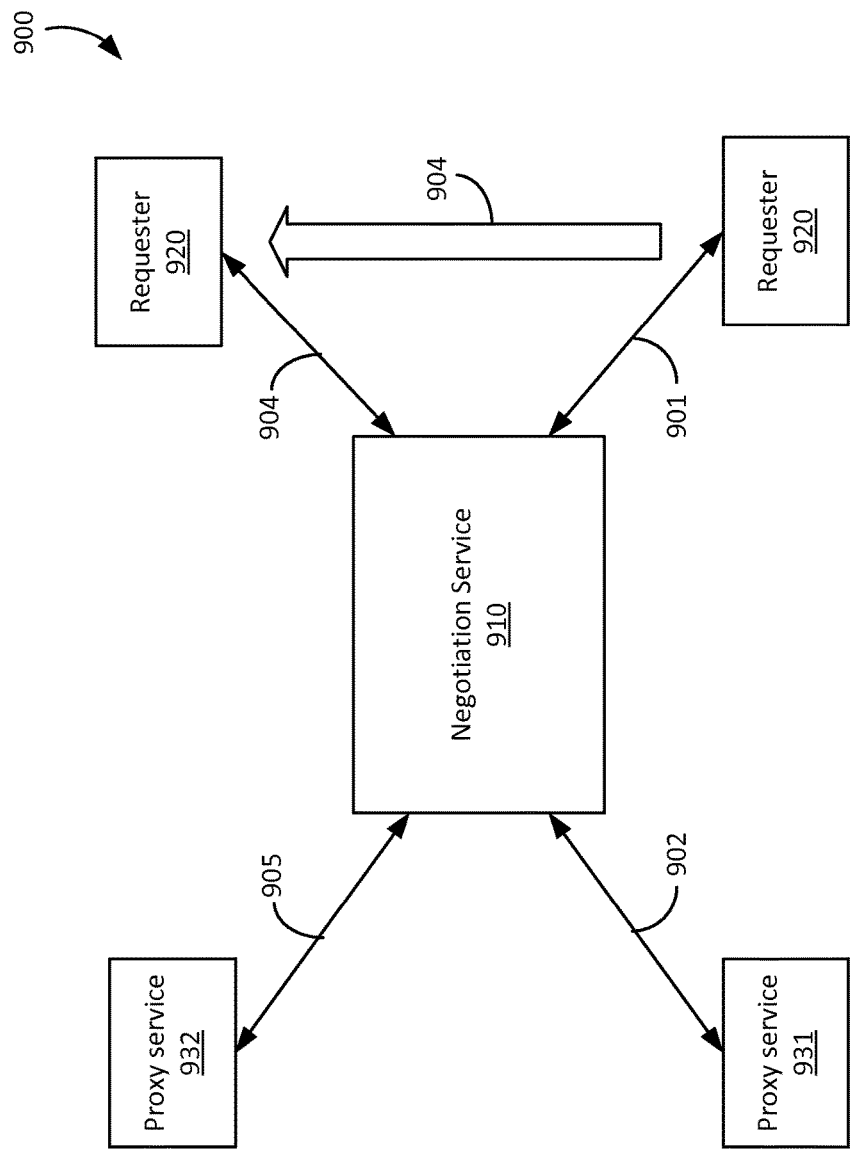
FIG. 9 illustrates an exemplary IoT intelligent negotiation configuration according to an embodiment.

FIG. 9 illustrates exemplary configuration 900 that provides an example of negotiation adaptation in response to requester mobility. Initially, at communications 901, negotiation requester 920 may request negotiation service from negotiation service 910 for proxy service. The requested negotiation may be performed at 902 such that requester 920 may be provided with proxy service by proxy service 931, in some embodiments with a service charge. In this example, negotiation service 910 may determine the negotiation party for a proxy service. Negotiation service 910 may discover multiple proxy service providers (e.g., proxy service 931 and proxy service 932). Negotiation service 910's cognition capability may determine a proxy service provider based on the context of the request and/or the requester. In this example, the relevant context may be location. Negotiation service 910 may determine that the preferred proxy service provider for negotiation requester 920's current location context is proxy service 931 because proxy service 931 is closer to negotiation requester 920 than any other proxy service. Accordingly, negotiation service 910 may negotiate on behalf of negotiation requester 920 with proxy service 931 for proxy services. However, negotiation requester 920 may move 904 to a new location. Negotiation service 910 may be informed of the context change from a context-aware service. Negotiation service 910 and/or it cognition capability may adapt to the context change by determining that proxy service 932 is now most proximate to negotiation requester 920 among the available proxy services. In response, negotiation service 910 may negotiate on behalf of negotiation requester 920 with proxy service 932 for proxy services at 905, and notify negotiation requester 920 of the proxy server change at communications 904.

Figure 10:
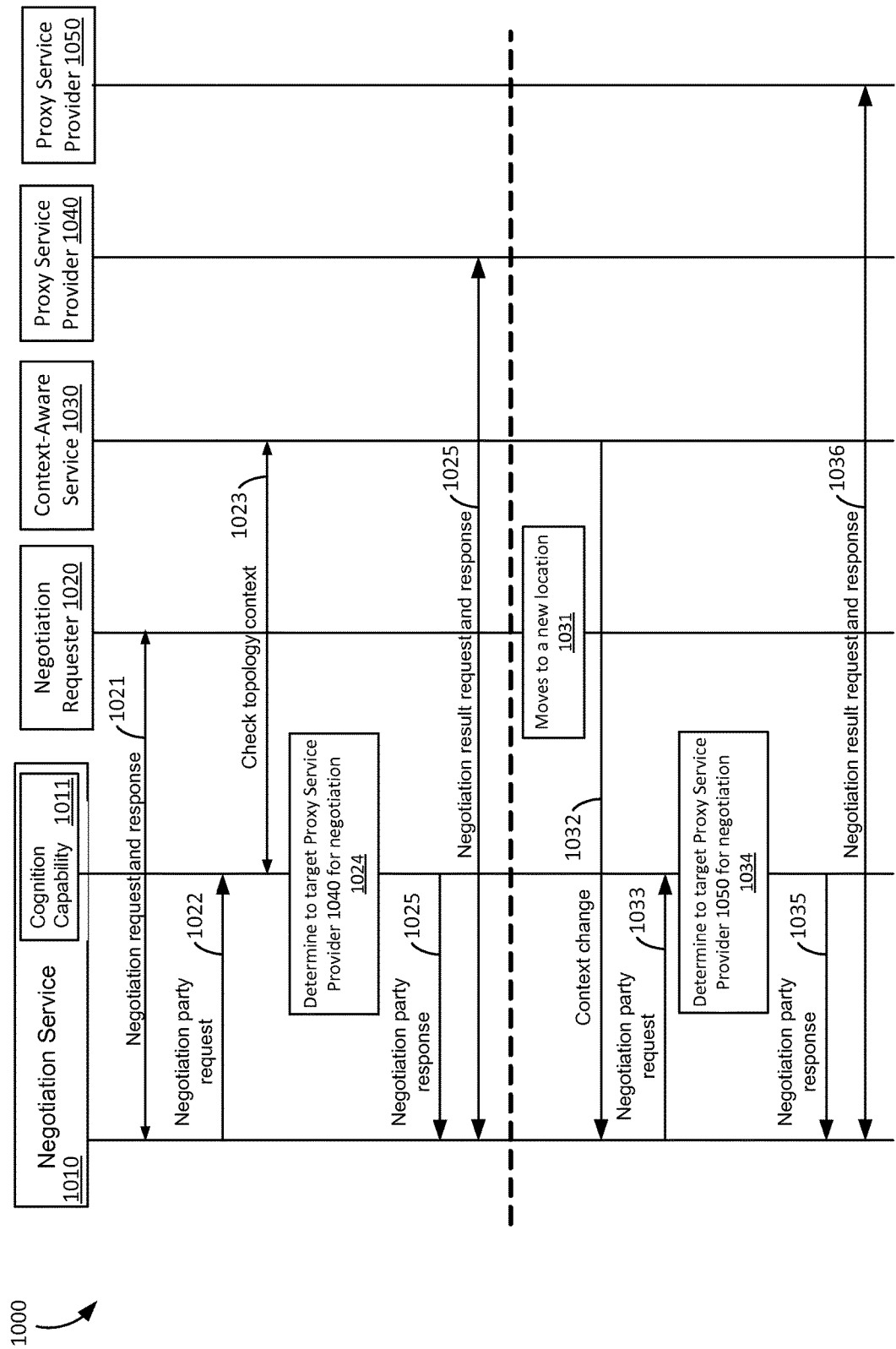
FIG. 10 illustrates an exemplary intelligent negotiation signal flow according to an embodiment.

FIG. 10 illustrates exemplary signal flow 1000 that may be used in some embodiments to adapt negotiation services to changing conditions, such as the mobility of a negotiation requester as described in regard to FIG. 9. In an embodiment, negotiation service 1010 may include cognition capability 1011. Negotiation service 1010 may receive a negotiation request from negotiation requester 1020 and may send a response at 1021. Negotiation service 1010 may request that cognition capability 1011 determine the parties of the negotiation at 1022. Negotiation service 1010, in an embodiment via cognition capability 1011, may request that context-aware service 1030 return an indication of the location of requester 1020 and may receive the indication at 1023. Based on the received location, cognition capability 1011 may determine at 1024 that negotiation requester 1020 is at a location that is most proximate to proxy service provider 1040 from among the available proxy service providers. The proxy service provider information may be provided to negotiation service 1010 at 1025 and negotiation service 1010 may negotiate for proxy service for negotiation requester 1020 at 1025 on behalf of negotiation requester 1020.

At 1031, negotiation requester 1020 may move to a different area that may be more proximate to proxy service provider 1050 than to proxy service provider 1040. At 1032, a context change notification may be provided to negotiation service 1010 by context-aware service 1030. Context change notification 1032 may include negotiation requester 1020's current location or it may include an indicator that causes negotiation service 1010 to determine a current location for negotiation requester 1020. At 1033, negotiation service 1010 may request that cognition capability 1011 determine a current best proxy service provider based on negotiation requester 1020's current location, which cognition capability 1011 may determine at 1034. A response including an indication that proxy service provider 1050 is the current best proxy service provider for negotiation requester 1020 based on negotiation requester 1020's current location may be provided to negotiation service 1010 at 1035. In response, negotiation service 1010 may negotiate for proxy service for negotiation requester 1020 at 1036 on behalf of negotiation requester 1020.

A negotiation service may store the negotiation results and related data from past negotiations, such as a determined negotiation party and negotiation strategy used in a past negotiation processes. The negotiation service may use this cached information when it determines that a similar negotiation request is received from a negotiation requester. A negotiation service may also determine a generalized negotiation strategy based on summarized data from the negotiation processes. A negotiation service may detect patterns in certain negotiation scenarios and relate these patterns to current negotiation requests, using the past negotiation parameters and data in a similar current negotiation. This may relieve the negotiation service from employing its cognition capability for determining a negotiation strategy, parties, etc.

Figure 11:
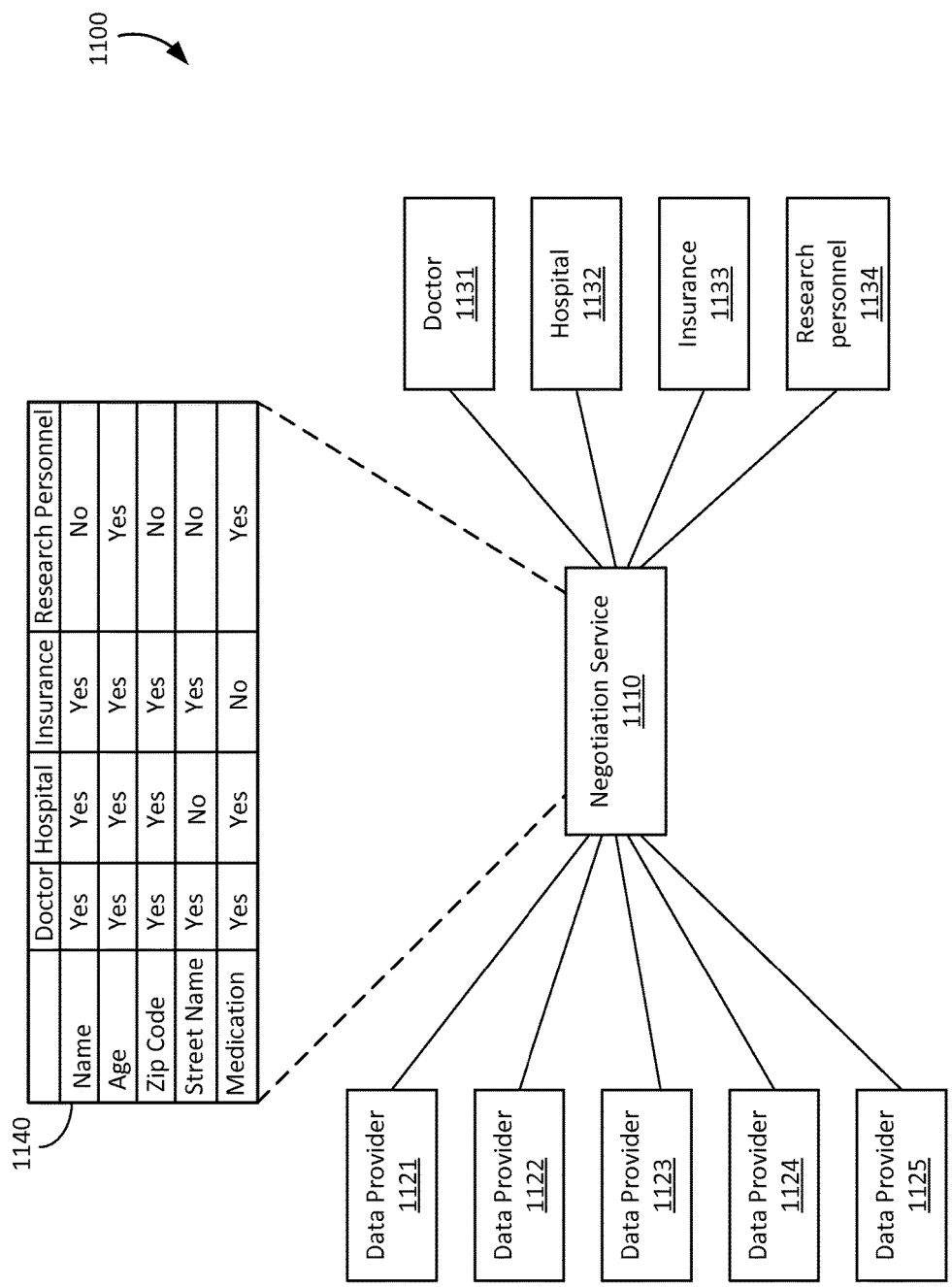
FIG. 11 illustrates an exemplary IoT intelligent negotiation configuration according to an embodiment.

FIG. 11 illustrates exemplary configuration 1100 of IoT entities and a negotiation service. Data consumers 1131-1134 may be any consumers of data, such as consumers, retailers, carriers, service providers, network providers, etc. In this example, data consumers 1131-1134 are medical-related entities, such as doctor 1131, hospital 1132, medical insurance 1133, and medical research personnel 1134. Data providers 1121-1125 may be any data providers, such as patients, customers, consumers, sensor nodes in a home or business (e.g., temperature sensors, motion sensors), etc. In this example, data providers 1131-1134 may be devices or entities associated with patients or people otherwise under the care of a physician.

Negotiation service 1110 may summarize and/or generalize negotiation policies after performing one or more negotiation processes on behalf of a data provider, such as one of data providers 1121-1125. For example, negotiation service 1110 may determine a common negotiation strategy that can be used for each pair of data consumer and data provider. This may be based on an initial negotiation strategy determined at a first request for data handled between a pair of data consumer and data provider. Table 1140 of FIG. 11 provides an example of information that negotiation service 1110 may maintain for each data consumer with which it interacts. This data may indicate the data that may or may not be provided to a specific data consumer for a particular data provider. For example, where table 1140 represents the data restrictions associated with data provider (e.g., a patient) 1122, negotiation service 1110 may provide name, age, zip code, street name, and medication information to data provider 1122's doctor, while only providing name, age, zip code, and street name to an insurance provider. Table 1140, or similar data, may be generalized to apply to all IoT entities that interact with negotiation service 1110. This negotiation generalization method may decrease a cognition capability's load in determining a negotiation strategy each time a data provider requests a service.

Negotiation results, such as determined negotiation parties and strategies from previous negotiation processes, may be subscribed to by services and clients other than those involved in the original negotiation that generated the previous negotiation results. A requester interested in similar negotiation topics may request to subscribe to this information. Any adaptation to the subscribed negotiation activity may generate a notification to the subscribers. This subscription mechanism may enable the autonomous adaptation of subscribers to new negotiation conditions. If a subscriber is using negotiation results from a subscription, any change to the subscribed negotiation conditions or parameters may trigger the subscriber to automatically adapt adjust to the new conditions or parameters. With the negotiation subscription, other entities are able to re-use and follow a negotiation result.

Figure 12:
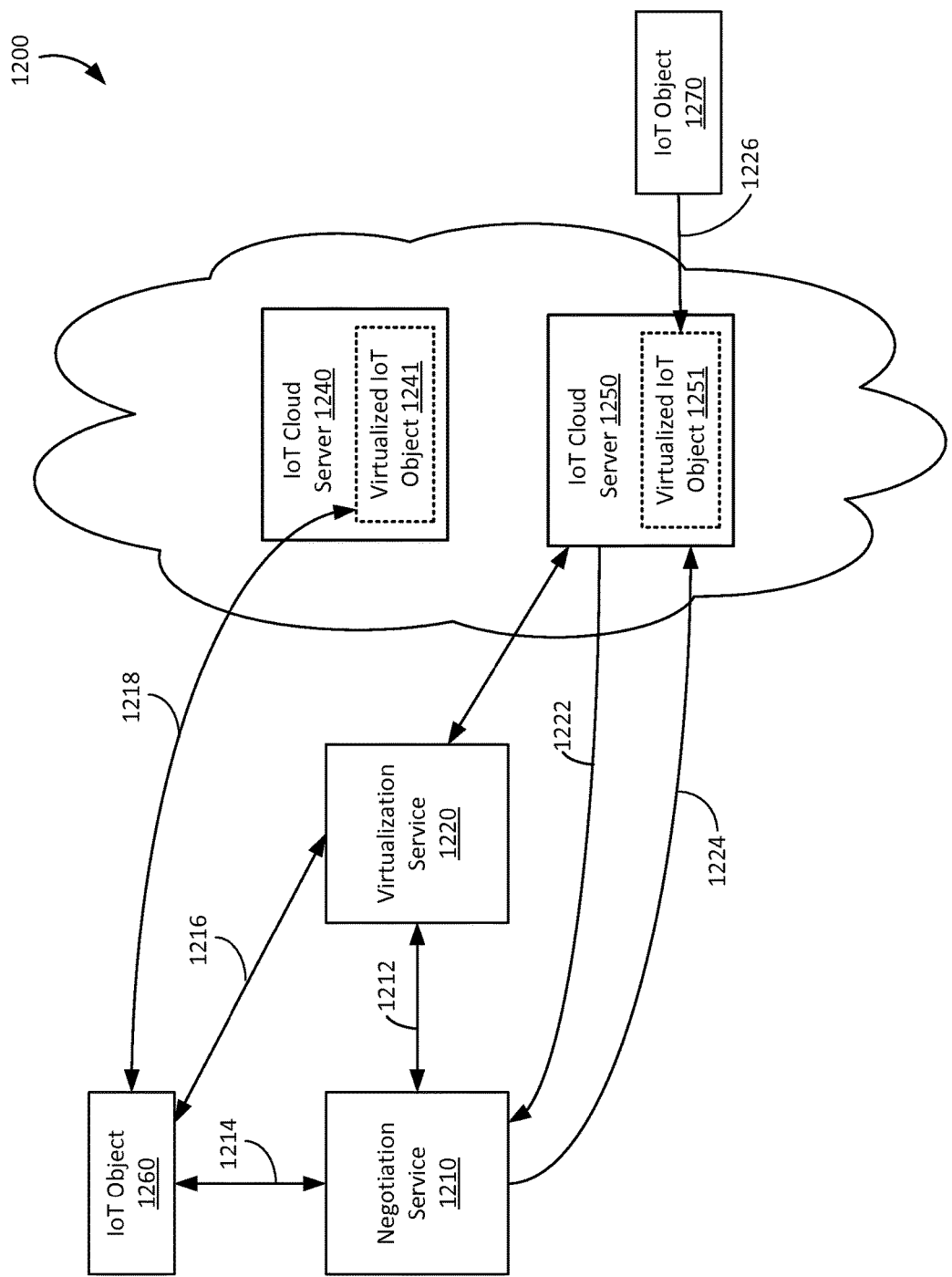
FIG. 12 illustrates an exemplary IoT architecture in which intelligent negotiation service may be implemented according to an embodiment.

FIG. 12 illustrates exemplary non-limiting configuration 1200 that may be used in some subscription scenarios. Here, the subscription to a virtualization policy. Virtualization service 1220 may request, at 1212, that negotiation service 1210 negotiate with IoT object 1260 for a virtualization policy. The policy may be associated, for example, with a time when the virtualization of IoT object 1260 may happen and where IoT object 1260 will be virtualized, etc. The negotiation at 1214 may happen between the IoT object 1260 and negotiation service 1210. After a negotiation agreement is reached between the virtualization service 1220 and IoT object 1260, at 1218 IoT object 1260 may be is virtualized at IoT cloud server 1240 as virtualized IoT object 1241 based on the virtualization policy.

At 1226, virtualization service 1220 may virtualize IoT object 1270 as virtualized IoT object 1251 at IoT cloud server 1250. IoT cloud server 1250 may subscribe to the same virtualization policy as that used by virtualized IoT object 1251 with request at 1222 for, and receipt at 1224 of, the same virtualization policy. If there is any negotiation adaptation that changes the subscribed virtualization policy, IoT cloud server 1250 may get notified when the negotiation adaptation policy is changed at 1212. IoT cloud server 1250 may the get notified when the negotiation adaptation policy is changed at 1212. In response, IoT cloud server 1250 may request at 1230 that virtualization service 1220 perform adaptation go it based on the new policy.

In an embodiment, two service providers which provide the same service may negotiate with each other for service duty collaboration. When one service provider is online, it may handle service requests intended for the other (possibly offline) service provider, such that they don't both need to be online all the time, thus saving resources such as power.

Figure 13:
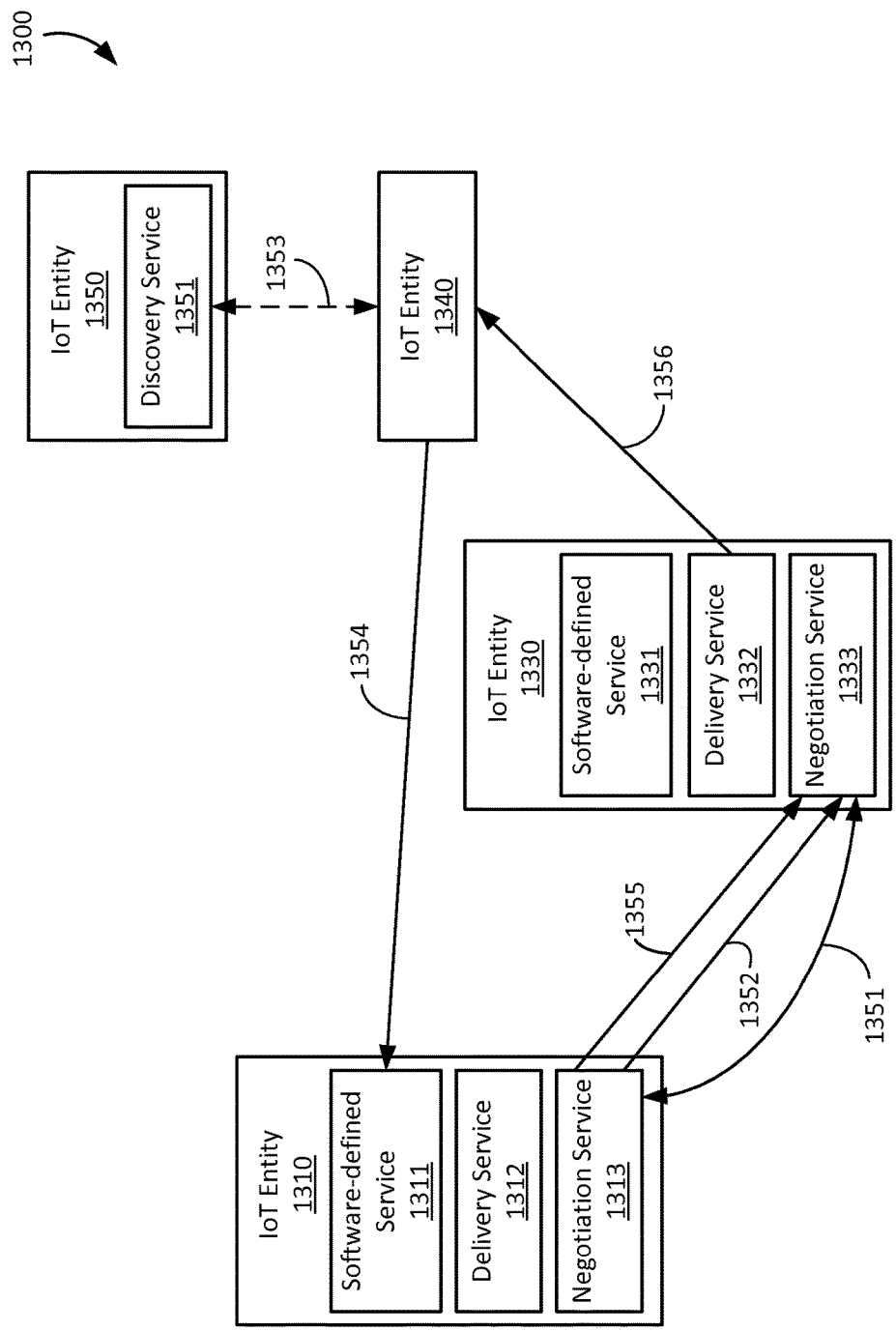
FIG. 13 illustrates an exemplary IoT intelligent negotiation configuration according to an embodiment.

FIG. 13 illustrates exemplary configuration 1300 in which an example of a negotiation service used for service duty cycling and offloading may be implemented. IoT entity 1310 may provide software defined service 1311 and may publish it to peer IoT entities, for example at 1351 to IT entity 1330. A software defined service may be a service that may be performed by any number and type of physical devices, and a service where the physical devices assigned to provide the service may change as needed, but that provides a consistent software interface to users or other entities regardless of the physical device configuration in current use. IoT entity 1330 that provides software defined service 1331 may determine, based on receiving publication of software defined service 1311 from IoT entity 1310 at 1351, that software defined service 1331 is a same or similar service as software defined service 1311. In response, IoT entity 1333 may initiate negotiation with IoT entity 1310 at 1352 to establish a duty cycle with IoT entity 1310, including when and how much one entity may offload another's service requests for the same software defined service. For example, the entities may determine times when one or the other entity will handle all requests for the same service and/or when to offload a request to the other entity based on any criteria, such as proximity to a requester.

IoT entity 1340 may discover from discovery service 1351 provided by IoT entity 1350 at 1353 that a desired software defined service is located at IoT entity 1310. IoT entity 1340 may requests the delivery of the desired software defined service via software defined service 1311 from IoT entity 1310 at 1354. However, IoT entity 1340 may be many hops away from the IoT entity 1310; that is, there may be many network nodes that traffic between these entities must travel. Alternatively, the distance, and therefore the network latency, between these nodes may be much greater than the distance between IoT entity 1340 and another entity that provides the requested service. IoT entity 1310 may determine that IoT entity 1330 is the most appropriate entity to deliver the service to requester IoT entity 1340 because it is nearer to the requester and/or it is available to offload the service request. Thus, the IoT entity 1310 may redirect the request at 1355 to IoT entity 1330, which may closer to IoT entity 1340. IoT entity 1330 may then provide the service to IoT entity 1340 at 1356. As a result, the negotiation service greatly improves the performance for IoT entity 1340 in latency and efficiency.

Figure 14:
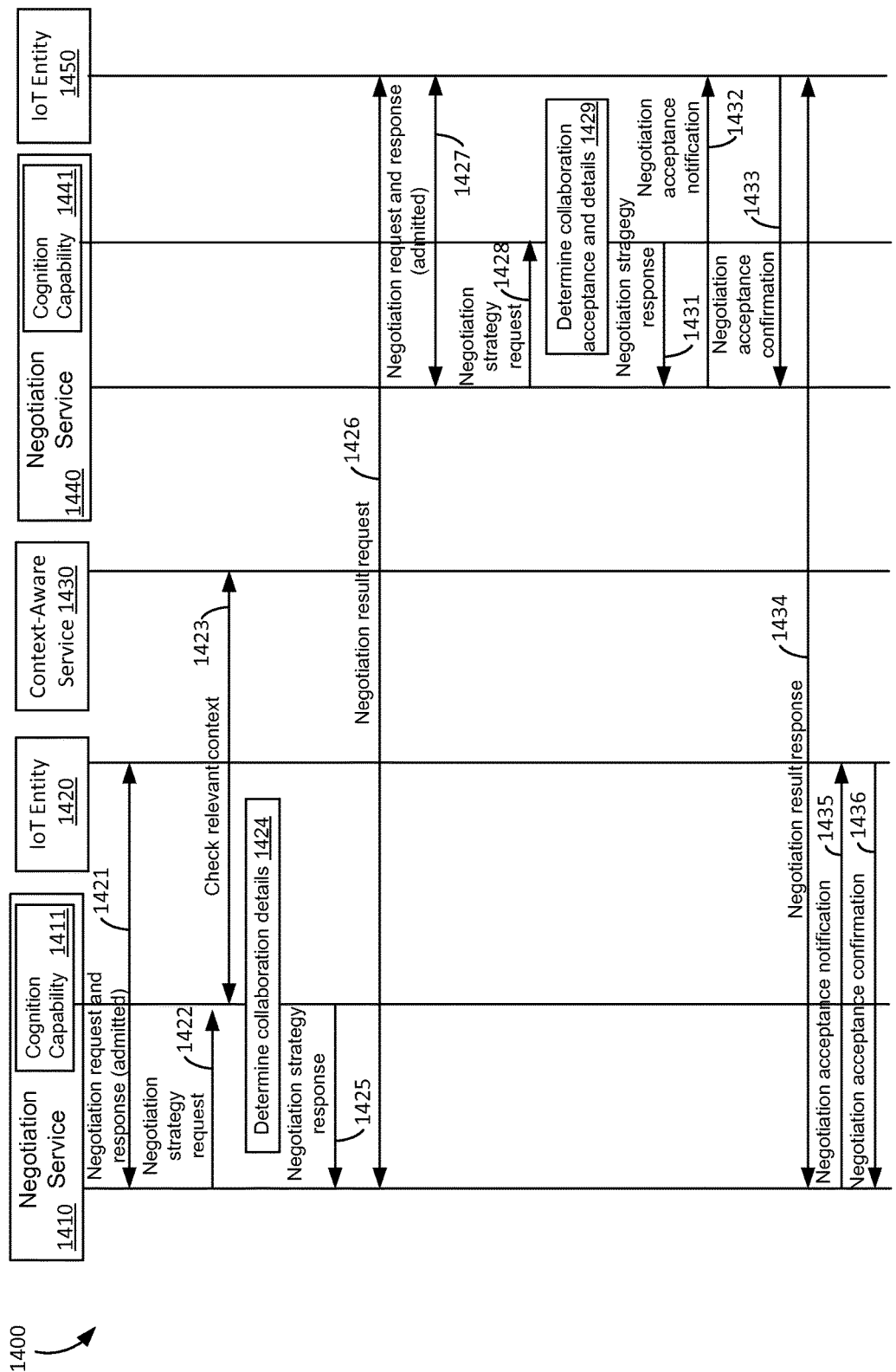
FIG. 14 illustrates an exemplary intelligent negotiation signal flow according to an embodiment.

FIG. 14 illustrates exemplary signal flow 1400 that may be used in some embodiments to use negotiation services to establish service duty cycles and offloading, such as the situation described in regard to FIG. 13. In an embodiment, negotiation service 1410 may include cognition capability 1411. Negotiation service 1410 may receive and respond to a negotiation request from IoT entity 1420 at 1421. Negotiation service 1410 may request that cognition capability 1411 determine the negotiation strategy at 1422. Negotiation service 1410, in an embodiment via cognition capability 1411, may request that context-aware service 1430 return an indication of the relevant context of IoT entity 1020 and may receive the indication at 1423. This context information may include information that allows cognition capability 1411 determine that both IoT entity 1420 and IoT entity 1450 offer a same or substantially similar service. This information may be determined by evaluating a smart IoT service profile, the locations of IoT entity 1420 and 1450, an online schedule of for the offered service, etc. Cognition capability 1411 may determine collaboration details and a feasible strategy for negotiation between the two entities at 1424 and provide that as a negotiation response to negotiation service 1410 at 1425.

Negotiation service 1410 may send a negotiation result request to IoT entity 1450 at 1426 with a collaboration proposal. IoT entity 1450 may negotiate with negotiation service 1410 directly or it may send a negotiation request to its chosen negotiation service 1440 at 1427. In the latter case, after negotiation service 1440 admits the negotiation request from IoT entity 1450, at 1428, the cognition capability receive a request to determine a negotiation strategy, makes the negotiation strategy decision and determination as to whether to accept or decline the negotiation request at 1429, and informs negotiation service 1440 of the strategy at 1431. Other collaboration details may be specified as well, such as an available service schedule, quantity and types of resources to share with IoT entity 1420, number of concurrent service tasks IoT entity 1450 may provide, etc.

At 1432, negotiation service 1440 provides a negotiation acceptance notification to IoT entity 1450. IoT entity 1450 may confirm negotiation acceptance by sending notification 1433 to the negotiation service 1440 and return a negotiation result response to negotiation service 1410 at 1434. Negotiation service 1410 may send a notification of negotiation acceptance confirmation to IoT entity 1420 at 1435, to which IoT entity 1420 may response with a confirmation at 1436.

Figure 15:
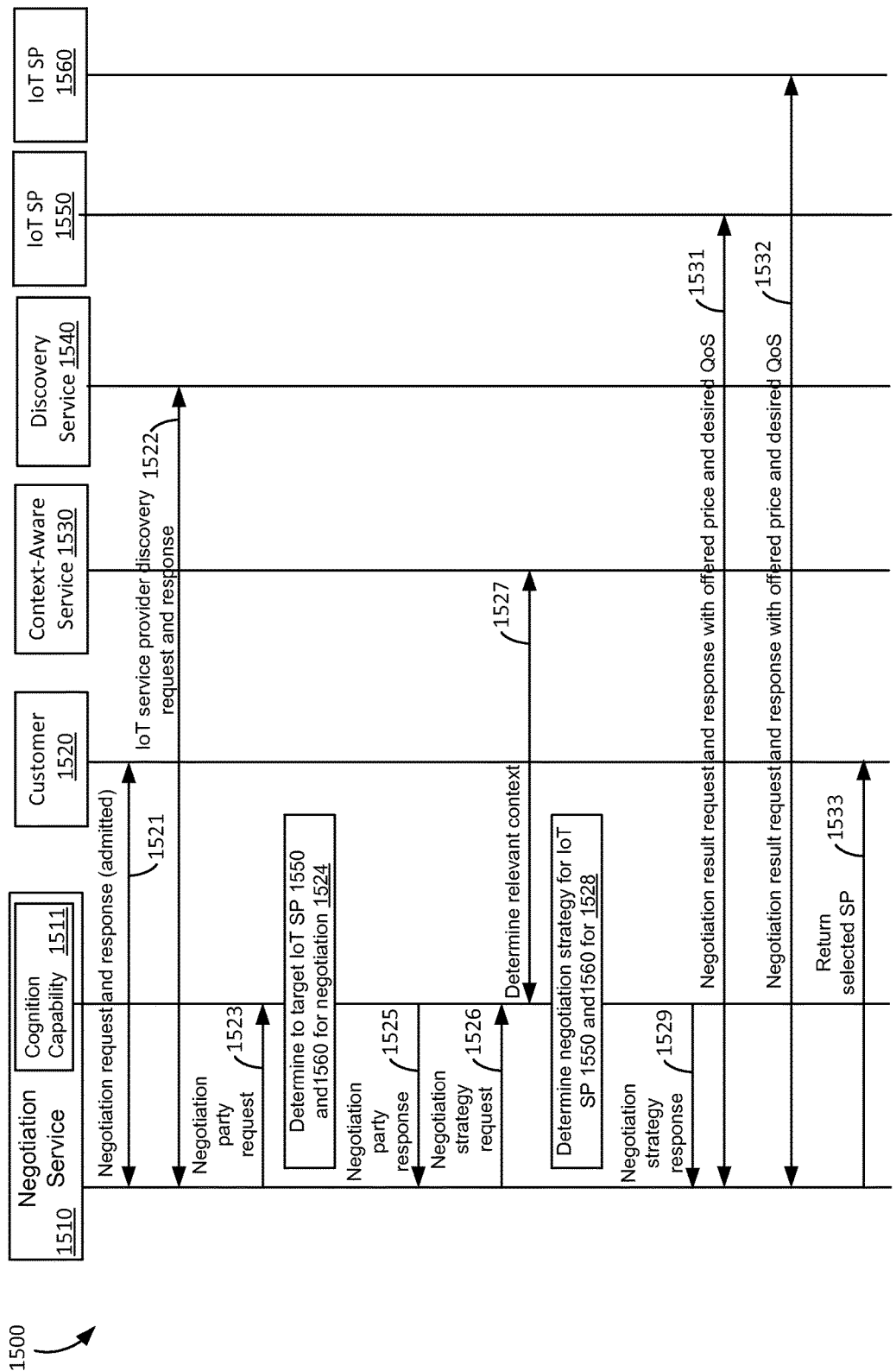
FIG. 15 illustrates an exemplary intelligent negotiation signal flow according to an embodiment.

There may be different IoT entities hosting a same or substantially similar IoT service, but that compete with each other for customers or other users. In an embodiment, a customer may request that a negotiation service negotiate with a potential IoT service provider to achieve the desired QoS at the lowest price. FIG. 15 shows one example of such a negotiation process using a negotiation service. In this embodiment, negotiation service 1510 may include cognition capability 1511. Negotiation service 1510 may receive and respond to a negotiation request from IoT entity customer 1520 at 1521. The request may include an indication of the type of service that customer 1520 is seeking and a price that customer 1520 is offering to pay for the service. Other information may also be provided. Negotiation service 1510 may send a negotiation admission request to cognition capability 1511, which may in turn decide to admit the negotiation request. Negotiation service 1510 may, at 1522, request and receive information about potential service providers that provide requested service from discovery service 1522. Then, to determine the most appropriate service providers with which to negotiate, negotiation service 1510 may send a negotiation party request to cognition capability 1511 at 1523.

Cognition capability 1511 may determine, using any criteria, including proximity, price, etc., that there are two service providers with which negotiation service 1510 will negotiate on behalf of customer 1520, IoT service provider 1550 ("IoT SP 1550" in FIG. 15) and IoT service provider 1560 ("IoT SP 1560" in FIG. 15). This information may be provided to negotiation service 1510 at 1526. Negotiation service 1510 may query cognition capability 1511 for a negotiation strategy for negotiating with the two service providers at 1526. Cognition capability 1511 may query context aware service 1530 to obtain information that may be used to develop a negotiation strategy. This context information may include each IoT service provider's charging policies with different QoSs, the resources needed by the service provider to serve customer 1520, the distance from each service provider to the customer requester, etc. Using this information, cognition capability 1511 may determine a strategy at 1528 and provide the strategy to negotiation service 1510 at 1529. Negotiation service 1510 may then negotiate with each of service provider 1550 and 1560 at 1531 and 1532, respectively, and, after receiving both negotiation responses from the IoT service providers, select a service provider based on the negotiations and received data. Negotiation service 1510 may send selected service provider data to customer 1520 at 1533.

Figure 16:
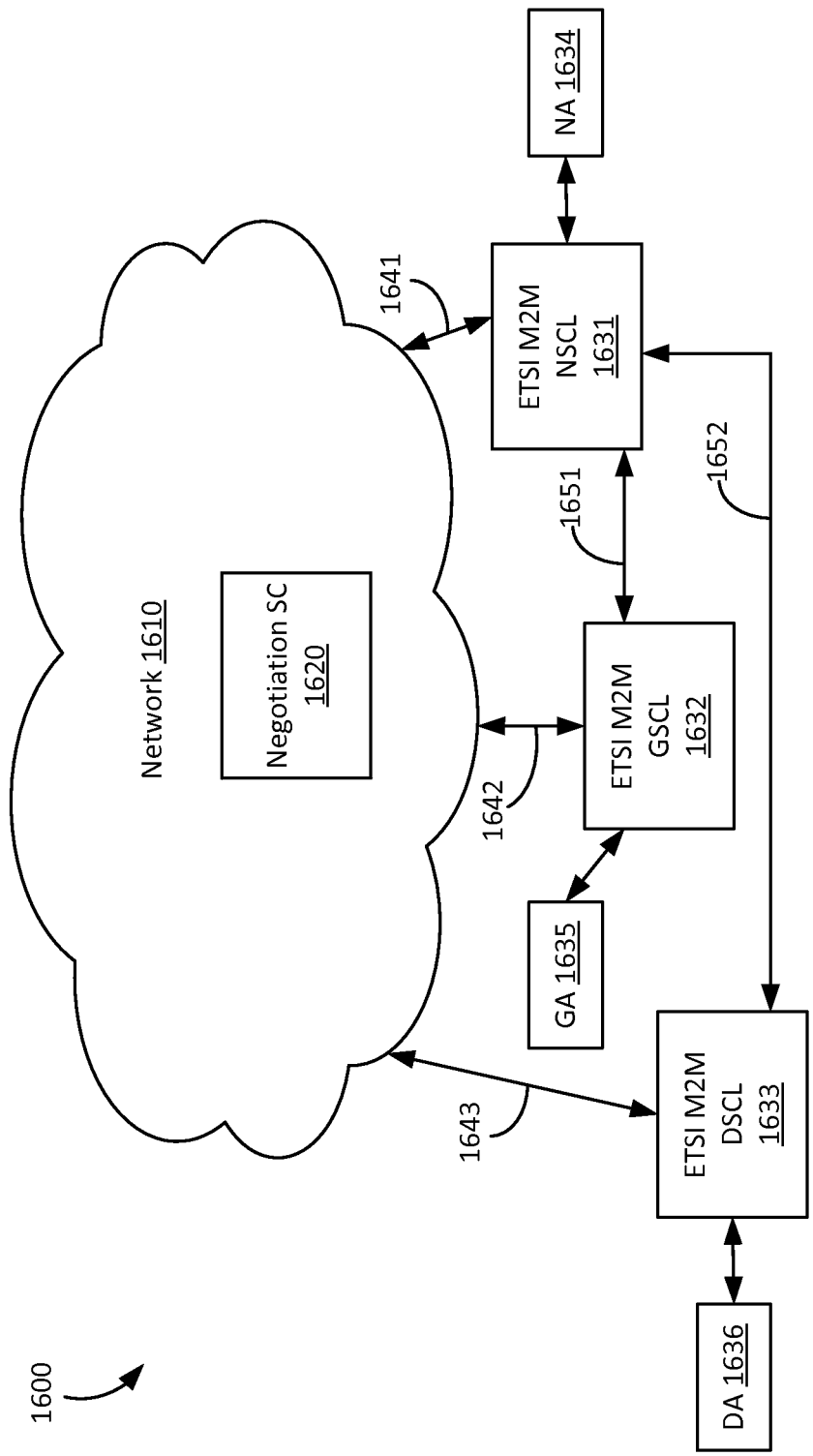
FIG. 16 illustrates an exemplary IoT intelligent negotiation configuration according to an embodiment.

The proposed embodiments may be incorporated and implemented in existing IoT systems and standards, such as an ETSI M2M architecture. In such an embodiment, an intelligent negotiation service may be mapped to be a negotiation service capability implemented by layering additional functionalities on top of the existing service capabilities. FIG. 16 illustrates example architecture 1600 in which such an embodiment may be implemented. Negotiation service capability 1620 ("Negotiation SC 1620" in FIG. 16) may reside in network 1610 (may be referred to as "the cloud") and all M2M devices, gateways, and servers may support a new service cloud interface, shown as interfaces 1641-1643 in FIG. 16, that may be used to access negotiation service capability 1620. M2M network service capability layer (NSCL) 1631, supporting network application 1634, may directly access negotiation service capability 1620 via service cloud interface 1641. M2M gateway service capability layer (GSCL) 1632, supporting gateway application 1635, may indirectly access the negotiation service capability 1620 via mId interface 1651 to NSCL 1631 or directly via service cloud interface 1642. M2M device service capability layer (DSCL) 1633, supporting device application 1636, may indirectly access the negotiation service capability 1620 via mId interface 1652 to NSCL 1631 or directly via service cloud interface 1643.

An M2M service capability layer (SCL) may include additional functionalities to support the service cloud interface (e.g., 1641-1643) to negotiation service capability 1620 that may be used for interactions between the negotiation service capability 1620 and the M2M SCL. Negotiation service capability 1620 may discover an existing M2M SCL (e.g., NSCL 1631, GSCL 1632, DSCL 1633). Negotiation service capability 1620 may publish or announce the newly discovered SCL an M2M SCL. Negotiation service capability 1620 may also access, monitor, and control an M2M SCL including dynamically configuring its behavior and accessing its resource tree. Negotiation service capability 1620 may further be shared and concurrently accessed by multiple other M2M SCLs. An M2M SCL may discover Negotiation service capability 1620 from the cloud. An M2M SCL (especially an NSCL such as NSCL 1631) may publish or announce itself to the negotiation service capability 1620 in the cloud. M2M SCL may access and leverage negotiation service capability 1620 in the cloud to serve itself or its hosted M2M SCLs.

Figure 17:
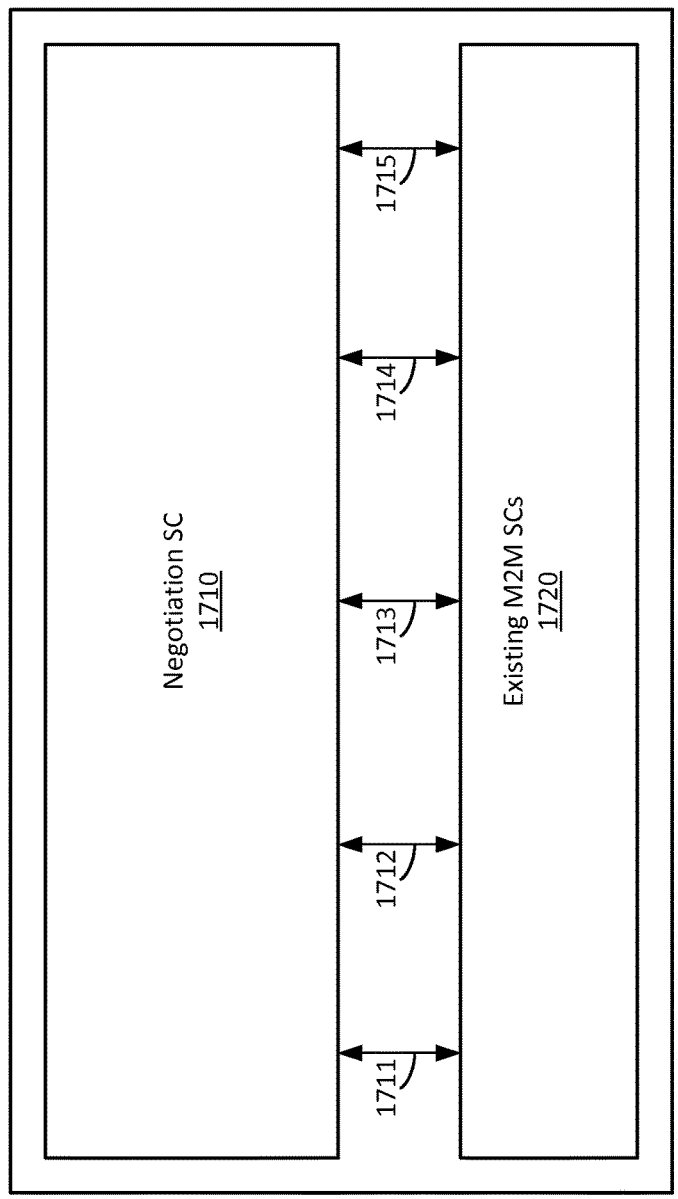
FIG. 17 illustrates an exemplary IoT intelligent negotiation configuration for intelligent negotiation service according to an embodiment.

In another embodiment, illustrated by exemplary configuration 1700 in FIG. 17, negotiation service capability 1710 ("Negotiation SC 1710" in FIG. 17) may be configured at each M2M device, gateway, and/or server 1720 (e.g., NSCL, GSCL, DSCL) (shown collectively at "Existing M2M SCs 1720" in FIG. 17) and new direct interfaces 1711-1715 between service capabilities may be used. For example, an M2M NSCL may host negotiation service capability 1710, while other SCLs, (e.g., GSCL, DSCL) do not locally have their own negotiation service capability but access a negotiation service capability by using the M2M NSCL.

Negotiations that may be performed by the disclosed embodiments include negotiation on the registration profiles between an M2M device and an M2M gateway, between an M2M gateway and an M2M server, etc. Another negotiation that may be performed by the disclosed embodiments is M2M device clustering and working schedule. Another negotiation that may be performed by the disclosed embodiments is negotiation between an M2M device and its M2M Gateway on the conditions under which the M2M device sends data to the M2M gateway. Yet another negotiation that may be performed by the disclosed embodiments is negotiation between M2M gateways on collaboration in managing M2M devices. Still another negotiation that may be performed by the disclosed embodiments is a negotiation between M2M servers of different M2M service providers for data sharing and pricing. Another further negotiation that may be performed by the disclosed embodiments is negotiation on the conditions for subscription notification for enabling conditional subscriptions.

Figure 18A:
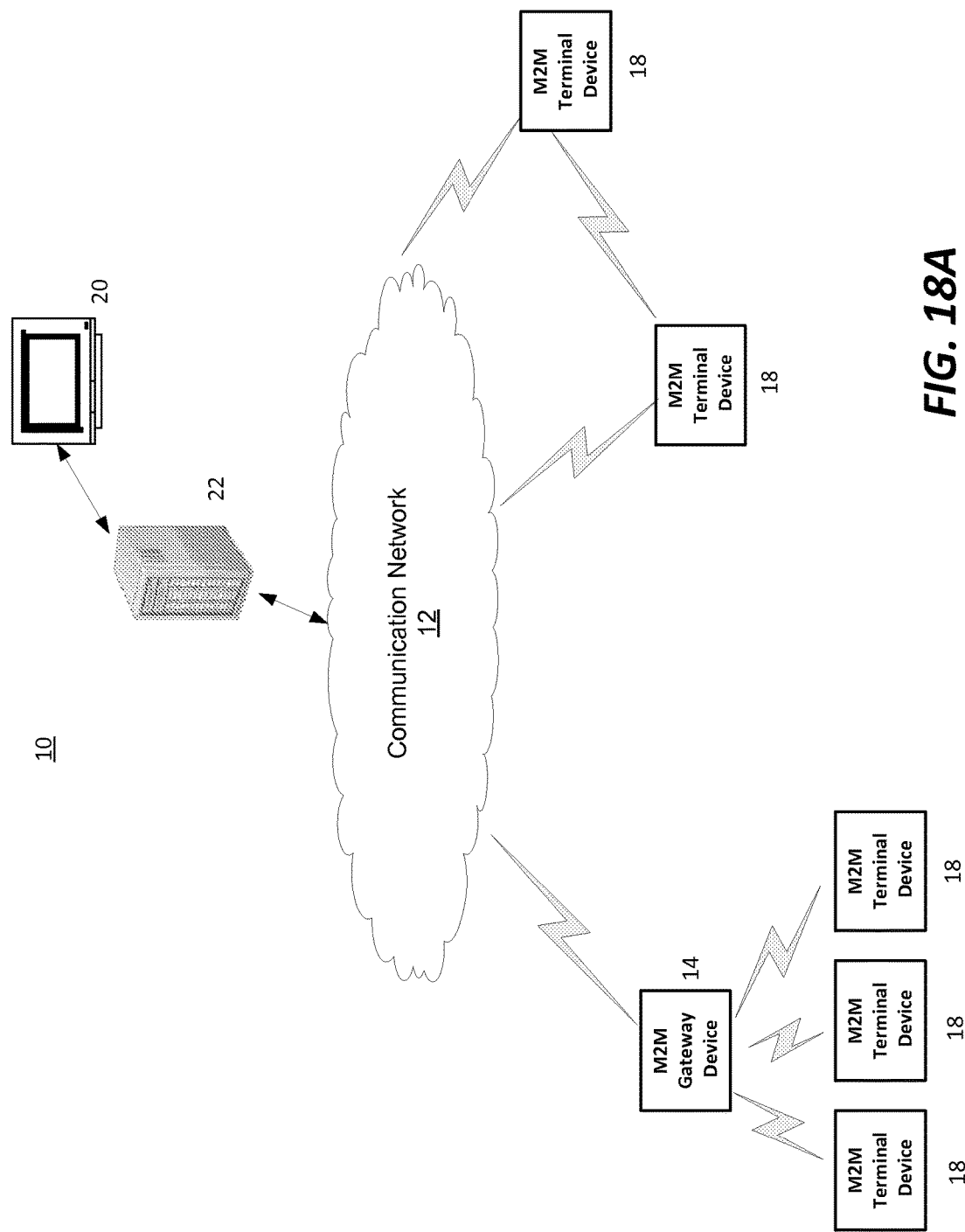
FIG. 18A is a system diagram of an example machine-to-machine (M2M) or Internet of Things (IoT) communication system in which one or more disclosed embodiments may be implemented.

FIG. 18A is a diagram of an example M2M or IoT communication system 10 in which one or more disclosed embodiments of systems and methods for an IoT intelligent negotiation service may be implemented. Generally, M2M technologies provide building blocks for the IoT, and any M2M device, gateway, or service platform may be a component of the IoT as well as an IoT service layer, etc.

As shown in FIG. 18A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 18A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 may be configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12, or through direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN (e.g., Zigbee, 6LoWPAN, Bluetooth), direct radio link, and wireline for example. Any of the entities described herein, such as negotiation services 110, IoT services 140, IoT applications 120, IoT entities 130, and any other disclosed IoT entities, may be implemented, executed, or otherwise enabled, partially or entirely, on devices such as M2M devices 18, gateways 14, and service platform 22. All such embodiments are contemplated as within the scope of the present disclosure.

The illustrated M2M service platform 22 provides services for the M2M application 20, M2M gateway devices 14, M2M terminal devices 18, and the communication network 12. It will be understood that the M2M service platform 22 may communicate with any number of M2M applications, M2M gateway devices 14, M2M terminal devices 18, and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 18B:
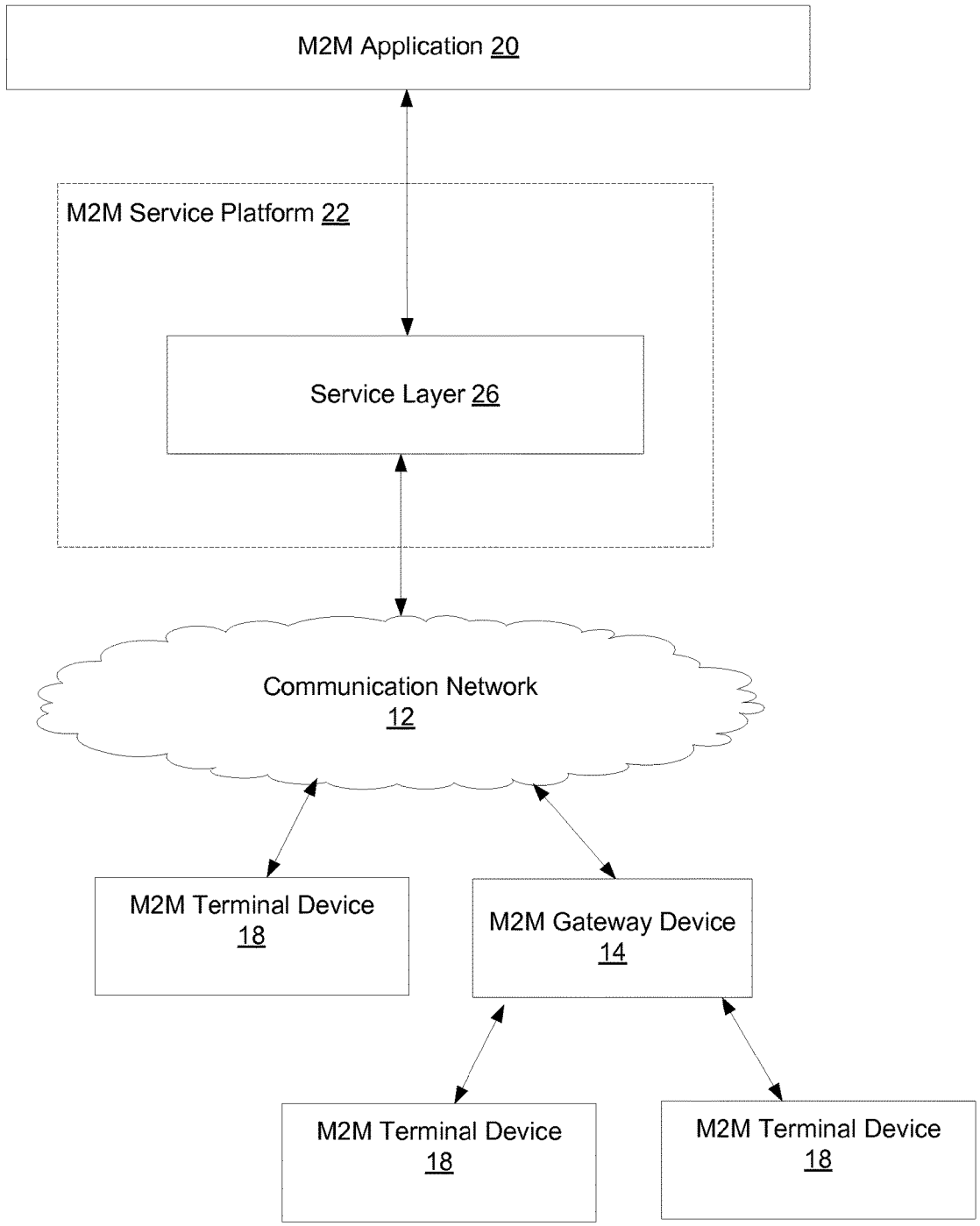
FIG. 18B is a system diagram of an example architecture that may be used within the M2M/IoT communications system illustrated in FIG. 18A.

Referring also to FIG. 18B, the M2M service platform typically implements a service layer 26 (e.g. a network service capability layer (NSCL) as described herein) that provides a core set of service delivery capabilities that diverse applications and verticals can leverage. These service capabilities enable M2M applications 20 to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

In some embodiments, M2M applications 20 may include desired applications that form the basis for creation of one or more peer-to-peer networks that include devices that may use the disclosed of systems and methods for an IoT intelligent negotiation service. M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20. The applications with which the described service layer and objects interact may be applications such as those of M2M applications 20.

Figure 18C:
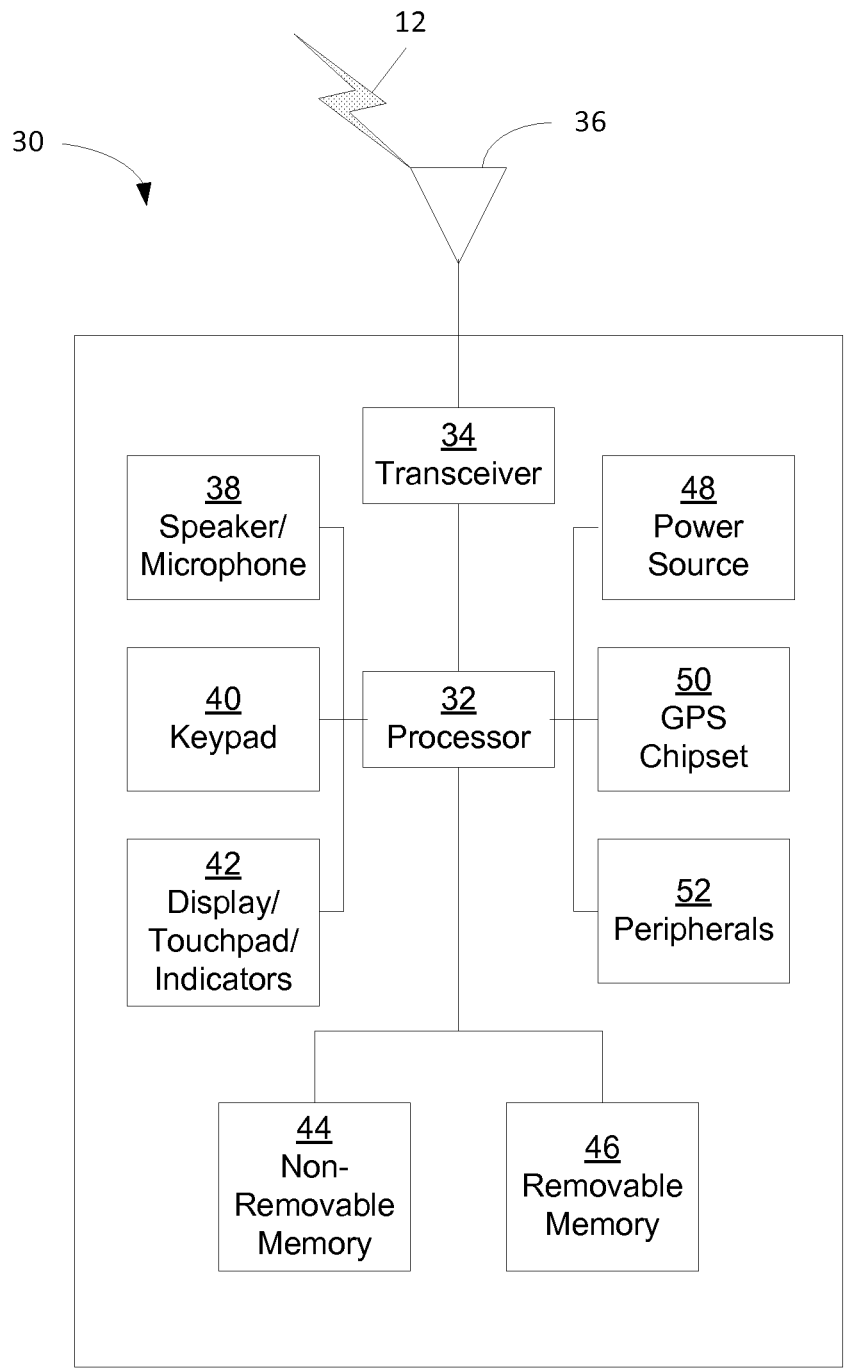
FIG. 18C is a system diagram of an example M2M/IoT terminal or gateway device that may be used within the communications system illustrated in FIG. 18A.

FIG. 18C is a system diagram of an example M2M device 30, such as an M2M terminal device 18 or an M2M gateway device 14 for example. As shown in FIG. 18C, the M2M device 30 may include a processor 32, a transceiver 34, a transmit/receive element 36, a speaker/microphone 38, a keypad 40, a display/touchpad/indicators (e.g., one or more light emitting diodes (LEDs)) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for an IoT intelligent negotiation service.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 18C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access layer and/or application layer for example.

The transmit/receive element 36 may be configured to transmit signals to, and/or receive signals from, an M2M service platform 9. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 18C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to various conditions and parameters, such as those described in some of embodiments set forth herein. For example, the processor 32 may be configured to control lighting patterns, images, or colors on the display or indicators 42 in response to a determination of whether an IoT negotiation service in some of embodiments described herein is successful or unsuccessful.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52 that may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 18D:
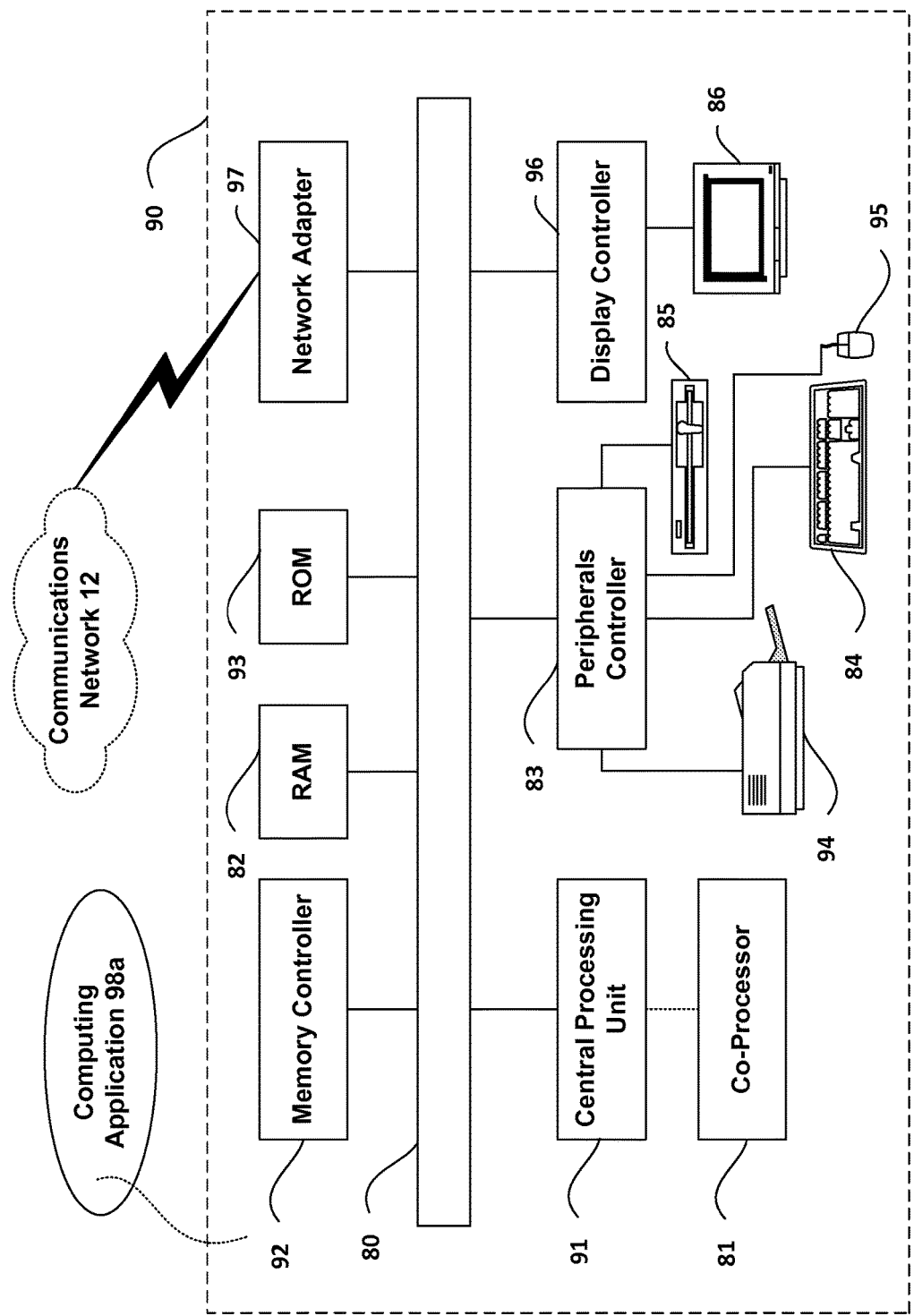
FIG. 18D is a block diagram of an example computing system in which aspects of the communication system of FIG. 18A may be embodied.

FIG. 18D is a block diagram of an exemplary computing system 90 on which, for example, the M2M service platform 22 of FIGS. 18A and 18B may be implemented. Computing system 90 may comprise a computer or server and may be controlled primarily by computer readable instructions that may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for an IoT intelligent negotiation service.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 18A and 18B. In an embodiment, network adaptor 97 may receive and transmit data related to the disclosed systems and methods for an IoT intelligent negotiation service.

It is understood that any or all of the systems, methods, and processes described herein may be embodied in the form of computer executable instructions (i.e., program code) stored on a computer-readable storage medium embodied as a physical device or apparatus. Such instructions, when executed by a machine, or a processor configured in a machine, such as a computer, server, M2M terminal device, M2M gateway device, or the like, effectuate, perform, and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   receiving, from a first entity at a negotiation service entity in a network of connected entities, a request comprising an indication of a service to be at least one of provided by the first entity or received by the first entity;
   admitting the first entity to the negotiation service entity;
   selecting, at the negotiation service entity, from a plurality of negotiation target entities, and based on receiving the request comprising the indication of the service, a negotiation target entity capable of one or more of providing the service to the first entity or receiving the service from the first entity;
   determining, based on the indication of the service, and based on selecting the negotiation target entity, a negotiation request for transmitting to the selected negotiation target entity;
   transmitting, to the selected negotiation target entity from the negotiation service entity, the negotiation request;
   receiving, from the selected negotiation target entity at the negotiation service entity, a negotiation response; and
   transmitting, to the first entity from the negotiation service entity, a negotiation result comprising an indication of the service to be provided by one of the first entity or the selected negotiation target entity to the other one of the first entity or the selected negotiation target entity.

2. The method of claim 1, wherein selecting the negotiation target entity comprises:
   transmitting a service provider discovery request to a discovery service; and
   receiving a service provider discovery response comprising a negotiation target entity identifier from the discovery service.

3. The method of claim 2, wherein the negotiation target entity identifier comprises a plurality of negotiation target entity identifiers and data associated with each respective negotiation target entity identifier of the plurality of negotiation target entity identifiers.

4. The method of claim 3, further comprising selecting the negotiation target entity identifier from among the plurality of negotiation target entity identifiers based on the data associated with each respective negotiation target entity identifier.

5. The method of claim 1, further comprising:
   determining a priority of the negotiation request;
   placing the negotiation request in a queue and selecting the negotiation request from the queue based on the priority of the negotiation request; and
   upon selection of the negotiation request from the queue, transmitting a negotiation request acceptance indication to the first entity.

6. The method of claim 1, further comprising:
   receiving a notification that a context of the first entity has changed since the negotiation request was received;
   determining that a second negotiation target entity is configured to provide a requested service associated with the negotiation request;
   transmitting a second negotiation request to the second negotiation target entity;
   receiving a second negotiation response from the second negotiation target entity; and
   transmitting a second negotiation result to the first entity.

7. The method of claim 1, wherein selecting the negotiation target entity comprises:
   determining that the negotiation request does not include the negotiation target entity; and
   determining the negotiation target entity based on at least one previous negotiation request, wherein the at least one previous negotiation request is associated with at least one of the first entity and a requested service associated with the negotiation request.

8. A negotiation service entity in a network of connected entities comprising:
   a first processor adapted to execute computer-readable instructions; and
   a first memory communicatively coupled to said first processor, said first memory having stored therein computer-readable instructions that, when executed by the first processor, cause the processor to perform operations comprising:
      receiving, from a first entity, a request comprising an indication of a service to be at least one of provided by the first entity or received by first entity;
      admitting the first entity to the negotiation service entity;
      selecting, from a plurality of negotiation target entities, and based on receiving the request comprising the indication of the service, a negotiation target entity capable of one or more of providing the service to the first entity or receiving the service from the first entity;
      determining, based on the indication of the service, and based on selecting the negotiation target entity, a negotiation request for transmitting to the selected negotiation target entity;
      transmitting, to the selected negotiation target entity, the negotiation request;

receiving, from the selected negotiation target entity, a negotiation response; and transmitting, to the first entity, a negotiation result comprising an indication of service to be provided by one of the first entity or the selected negotiation target entity to the other one of the first entity or the selected negotiation target entity.

9. The negotiation service entity of claim 8, wherein the first memory further comprises computer-readable instructions that, when executed by the first processor, cause the processor to perform operations comprising:

transmitting a service provider discovery request to a discovery service; and receiving a service provider discovery response comprising a negotiation target entity identifier from the discovery service, wherein the negotiation target entity identifier is associated with a negotiation target entity proximate to the first entity.

10. The negotiation service entity of claim 9, wherein the first entity and the selected negotiation target entity perform a same function.

11. The negotiation service entity of claim 9, wherein the first memory further comprises computer-readable instructions that, when executed by the first processor, cause the processor to perform operations comprising:

determining a work schedule for the first entity and the selected negotiation target entity.

12. The negotiation service entity of claim 9, wherein the first memory further comprises computer-readable instructions that, when executed by the first processor, cause the processor to perform operations comprising:

transmitting a context request to a context aware service; and receiving a context response comprising a context for the selected negotiation target entity and a context for the first entity.

13. The negotiation service entity of claim 12, wherein the first memory further comprises computer-readable instructions that, when executed by the first processor, cause the processor to perform operations comprising:

determining a work schedule for the first entity and the selected negotiation target entity based on the context for the selected negotiation target entity and the context for the first entity.

14. The negotiation service entity of claim 8, wherein the negotiation response comprises a negotiation rejection.

15. A negotiation service entity in a network of connected entities comprising:

a first processor adapted to execute computer-readable instructions; and a first memory communicatively coupled to said first processor, said first memory having stored therein computer-readable instructions that, when executed by the first processor, cause the processor to perform operations comprising:

receiving, from a first entity, a request comprising an indication of a service to be at least one of provided by the first entity or received by the first entity;

determining that the negotiation request does not indicate a particular negotiation target entity capable of one or more of providing the service to the first entity or receiving the service from the first entity;

selecting, from a plurality of negotiation target entities, and based on receiving the request comprising the indication of the service, a negotiation target entity capable of one or more of providing the service to the first entity or receiving the service from the first entity;

determining, based on the indication of the service, and based on selecting the negotiation target entity, a negotiation request for transmitting to the selected negotiation target entity;

transmitting, to the selected negotiation target entity, the negotiation request;

receiving, from the selected negotiation target entity, a negotiation response; and transmitting, to the first entity, a negotiation result comprising an indication of the service to be provided by one of the first entity or the selected negotiation target entity to the other one of the first entity or the selected negotiation target entity.

16. The negotiation service entity of claim 15, wherein the first memory further comprises computer-readable instructions that, when executed by the first processor, cause the processor to perform operations comprising:

receiving a second negotiation request from a second entity;

determining that the second entity has a higher priority than the first entity; and providing negotiation service to the second entity before providing negotiation service to the first entity.

17. The negotiation service entity of claim 15, wherein the first memory further comprises computer-readable instructions that, when executed by the first processor, cause the processor to perform operations comprising:

receiving a notification that a context of the first entity has changed since the negotiation request was received;

determining that a second negotiation target entity is configured to provide a requested service associated with the negotiation request;

transmitting a second negotiation request to the second negotiation target entity;

receiving a second negotiation response from the second negotiation target entity; and transmitting a second negotiation result to the first entity.

18. The negotiation service entity of claim 17, wherein the context of the first entity comprises at least one of a location of the first entity, memory resources of the first entity, processing resources of the first entity, bandwidth capabilities of the first entity, and a working schedule of the first entity.

19. The negotiation service entity of claim 15, wherein the negotiation service entity is configured on a machine-to-machine device.

20. The negotiation service entity of claim 15, wherein the first memory further comprises computer-readable instructions that, when executed by the first processor, cause the processor to perform operations comprising:

receiving a second negotiation request from the first entity after transmitting the negotiation request to the selected negotiation target entity and before receiving the negotiation response from the selected negotiation target entity; and transmitting a second negotiation result to the first entity indicating that the second negotiation request is a duplicate of the negotiation request.

* * * * *